Oct. 1, 1968 W. K. CROWDER 3,403,634
AUTOMATICALLY CONTROLLED RAILWAY PASSENGER VEHICLE SYSTEM
Filed July 22, 1964 16 Sheets-Sheet 1
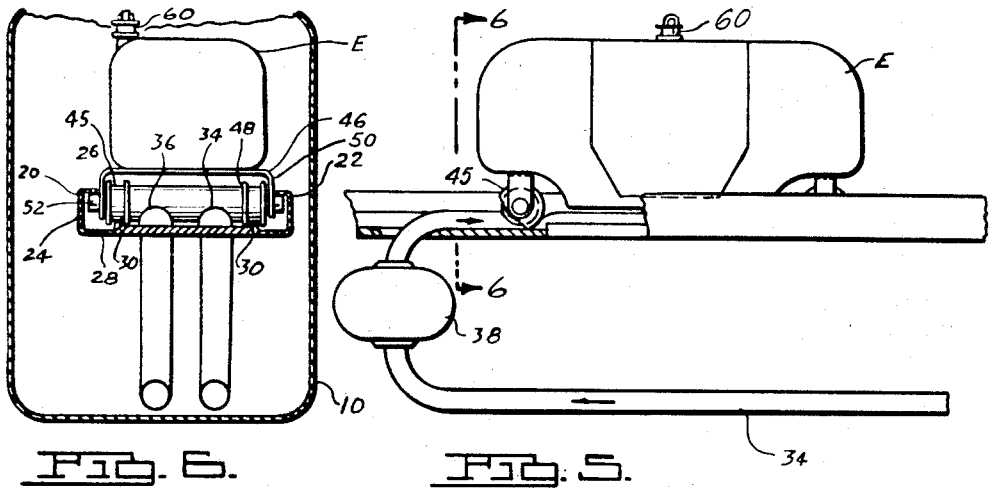
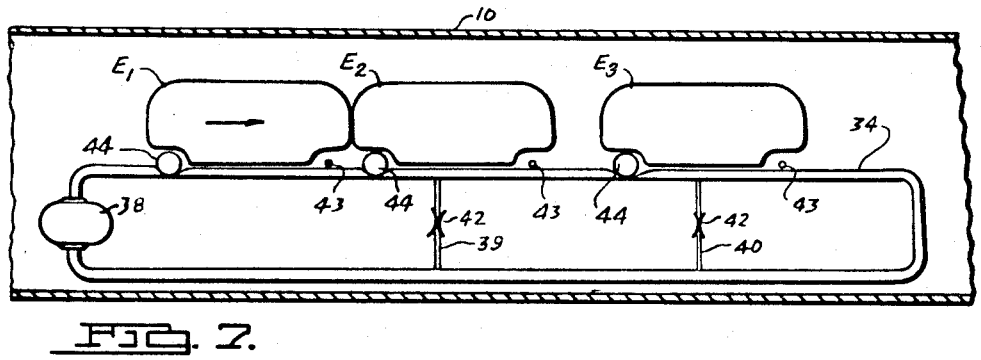
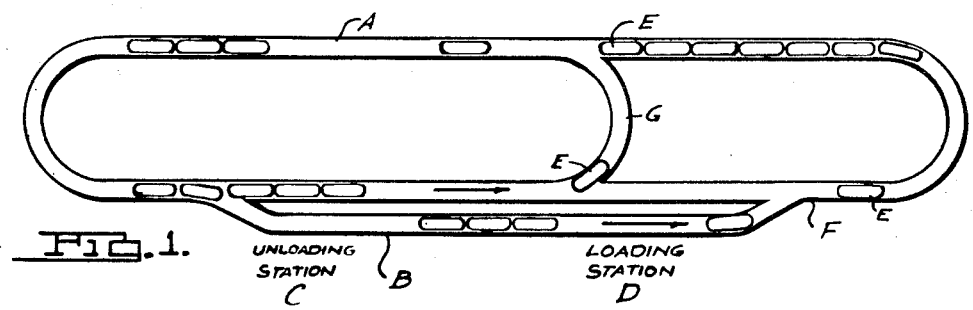
INVENTOR.
WYLY KENNETH CROWDER
BY
Whittemore Hulbert
& Belknap
ATTORNEYS Oct. 1, 1968                W. K. CROWDER                3,403,634
            AUTOMATICALLY CONTROLLED RAILWAY PASSENGER VEHICLE SYSTEM
Filed July 22, 1964                                   16 Sheets-Sheet 2

INVENTOR.
WYLY KENNETH CROWDER
BY
Whittemore, Hulbert
& Belknap
ATTORNEYS

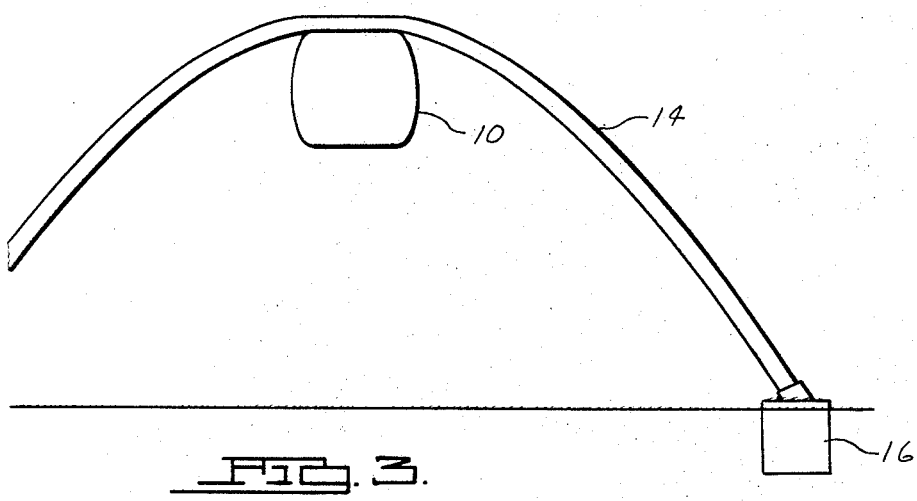
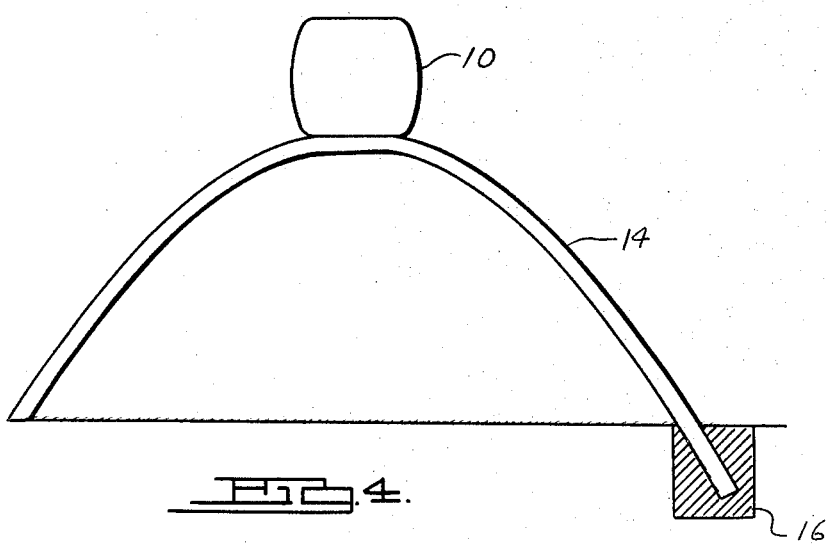

Oct. 1, 1968 W. K. CROWDER 3,403,634
AUTOMATICALLY CONTROLLED RAILWAY PASSENGER VEHICLE SYSTEM
Filed July 22, 1964 16 Sheets-Sheet 4

INVENTOR.
WYLY KENNETH CROWDER
BY
ATTORNEYS

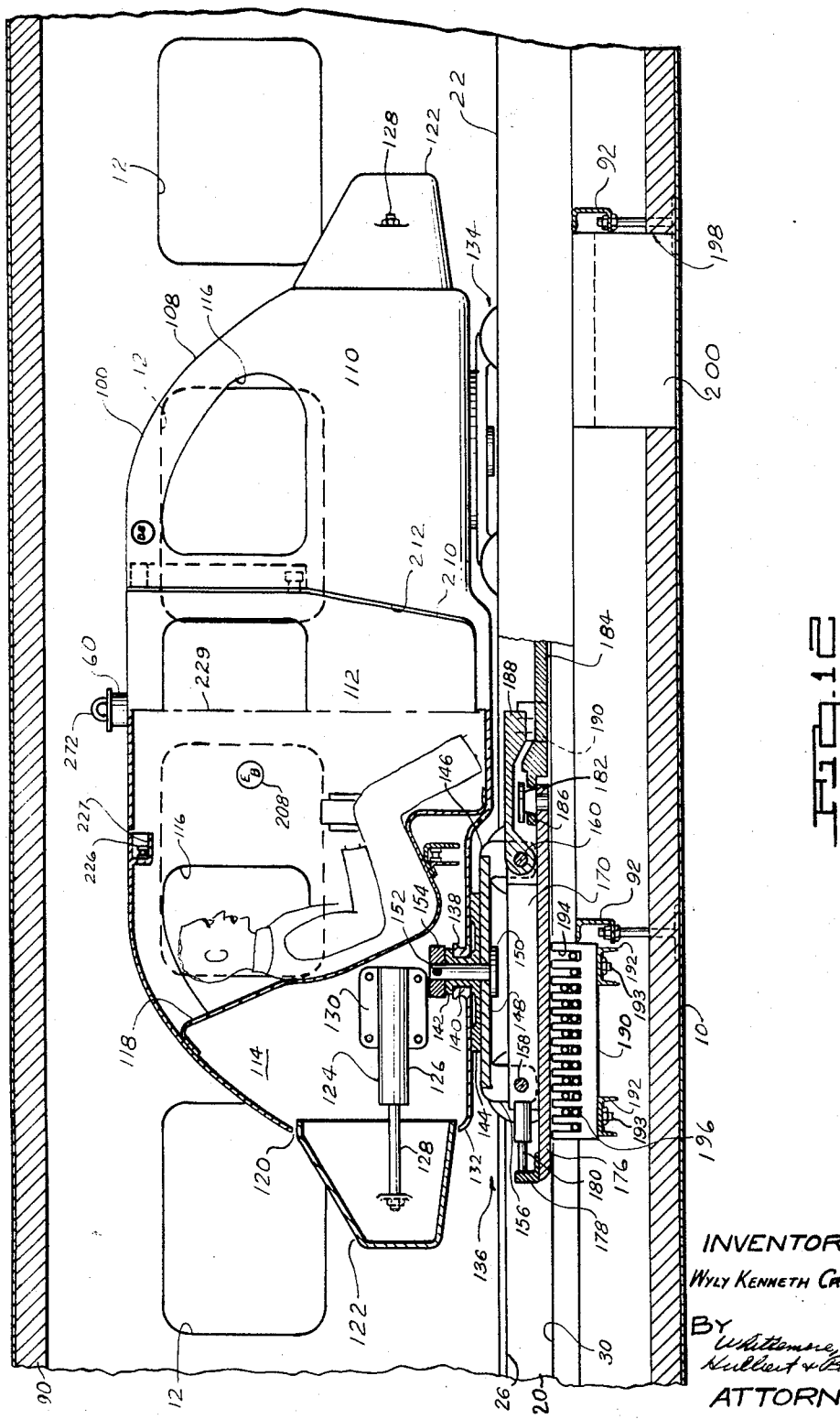

Oct. 1, 1968  W. K. CROWDER  3,403,634
AUTOMATICALLY CONTROLLED RAILWAY PASSENGER VEHICLE SYSTEM
Filed July 22, 1964  16 Sheets-Sheet 6

INVENTOR.
WYLY KENNETH CROWDER
BY Whittemore, Hulbert & Belknap
ATTORNEYS

Oct. 1, 1968
W. K. CROWDER
3,403,634
AUTOMATICALLY CONTROLLED RAILWAY PASSENGER VEHICLE SYSTEM
Filed July 22, 1964
16 Sheets-Sheet 9
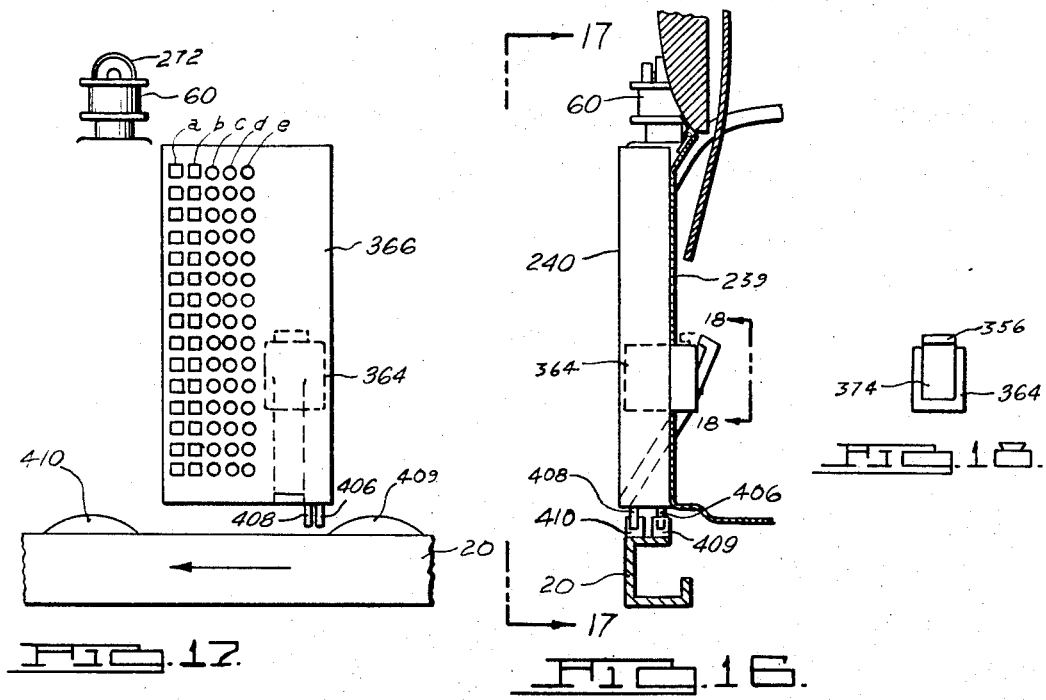
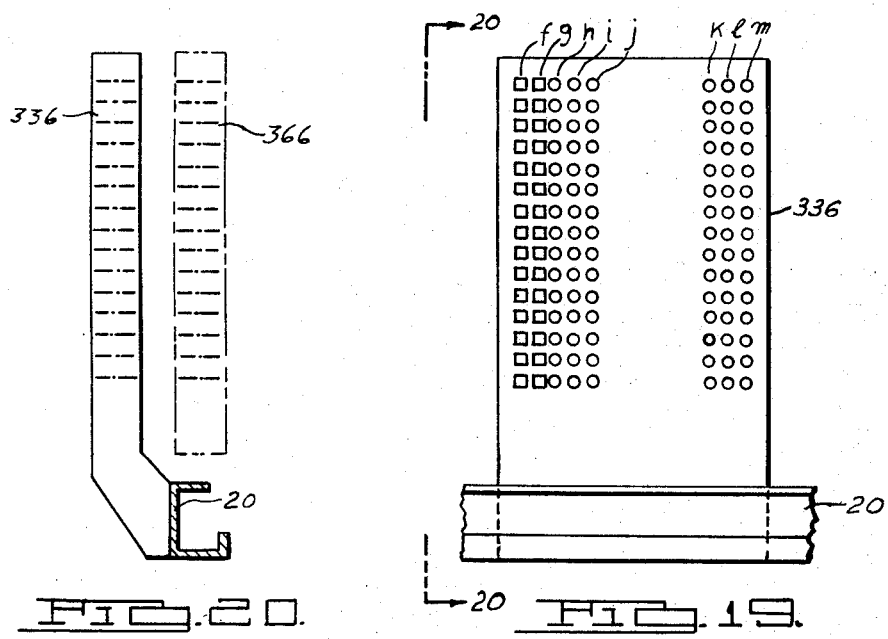
INVENTOR.
WYLY KENNETH CROWDER.
BY
ATTORNEYS Oct. 1, 1968  W. K. CROWDER  3,403,634
AUTOMATICALLY CONTROLLED RAILWAY PASSENGER VEHICLE SYSTEM
Filed July 22, 1964  16 Sheets-Sheet 10

INVENTOR.
WYLY KENNETH CROWDER
BY
Whittemore, Hulbert
& Belknap
ATTORNEYS

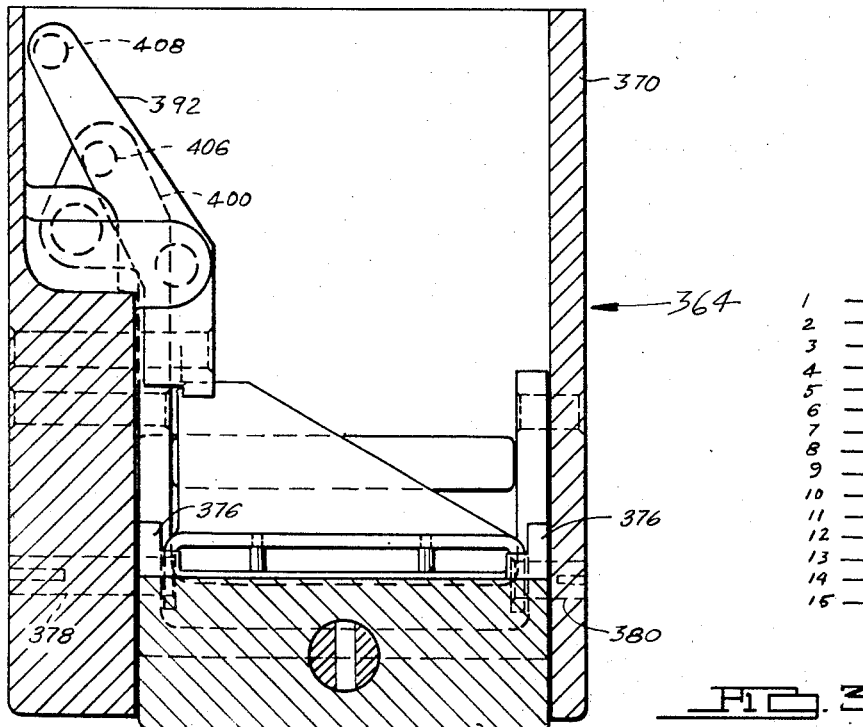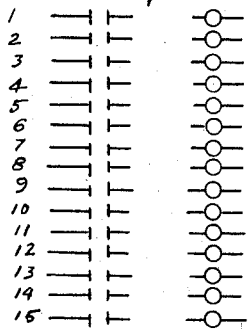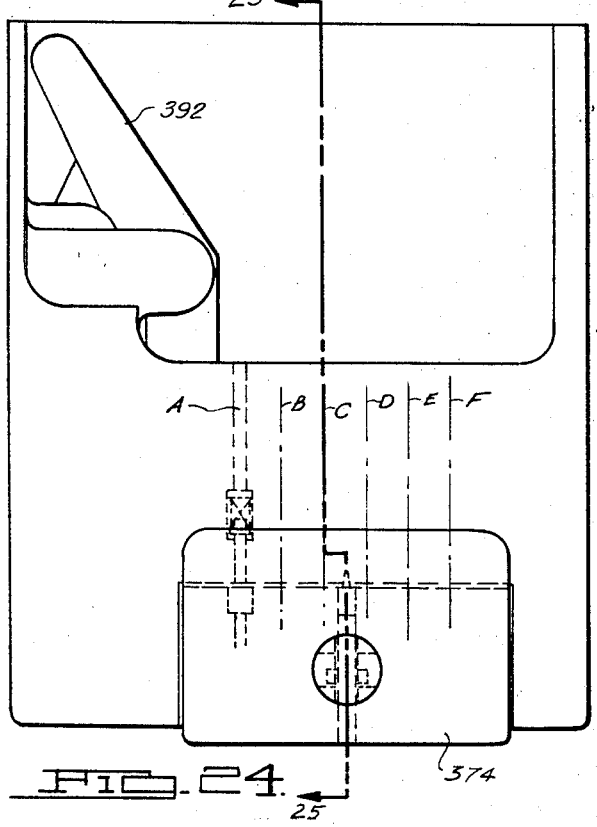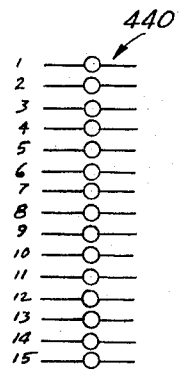

Oct. 1, 1968  W. K. CROWDER  3,403,634
AUTOMATICALLY CONTROLLED RAILWAY PASSENGER VEHICLE SYSTEM
Filed July 22, 1964  16 Sheets-Sheet 12

INVENTOR.
WYLY KENNETH CROWDER
BY
Whittemore, Hulbert
& Belknap
ATTORNEYS

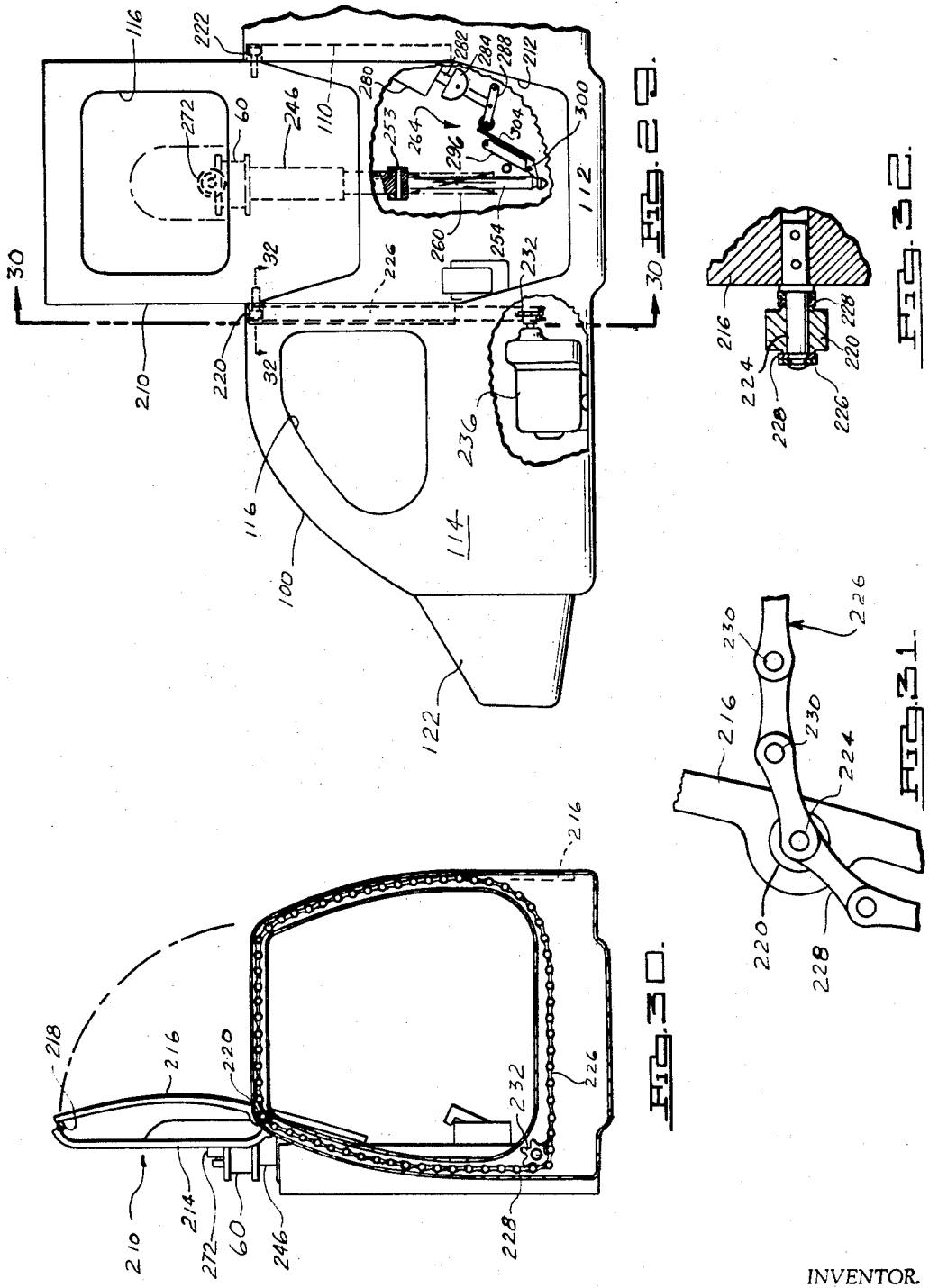

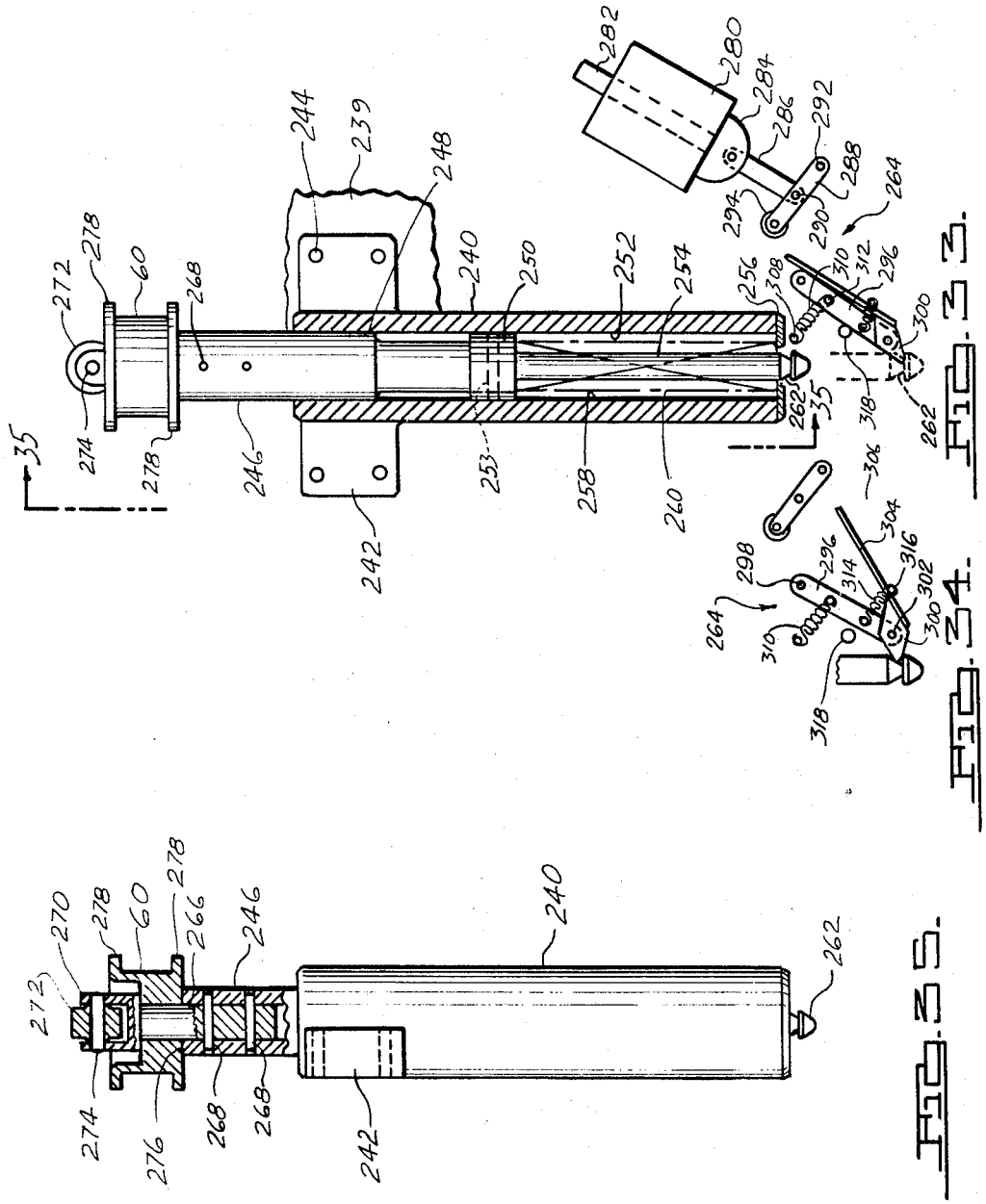

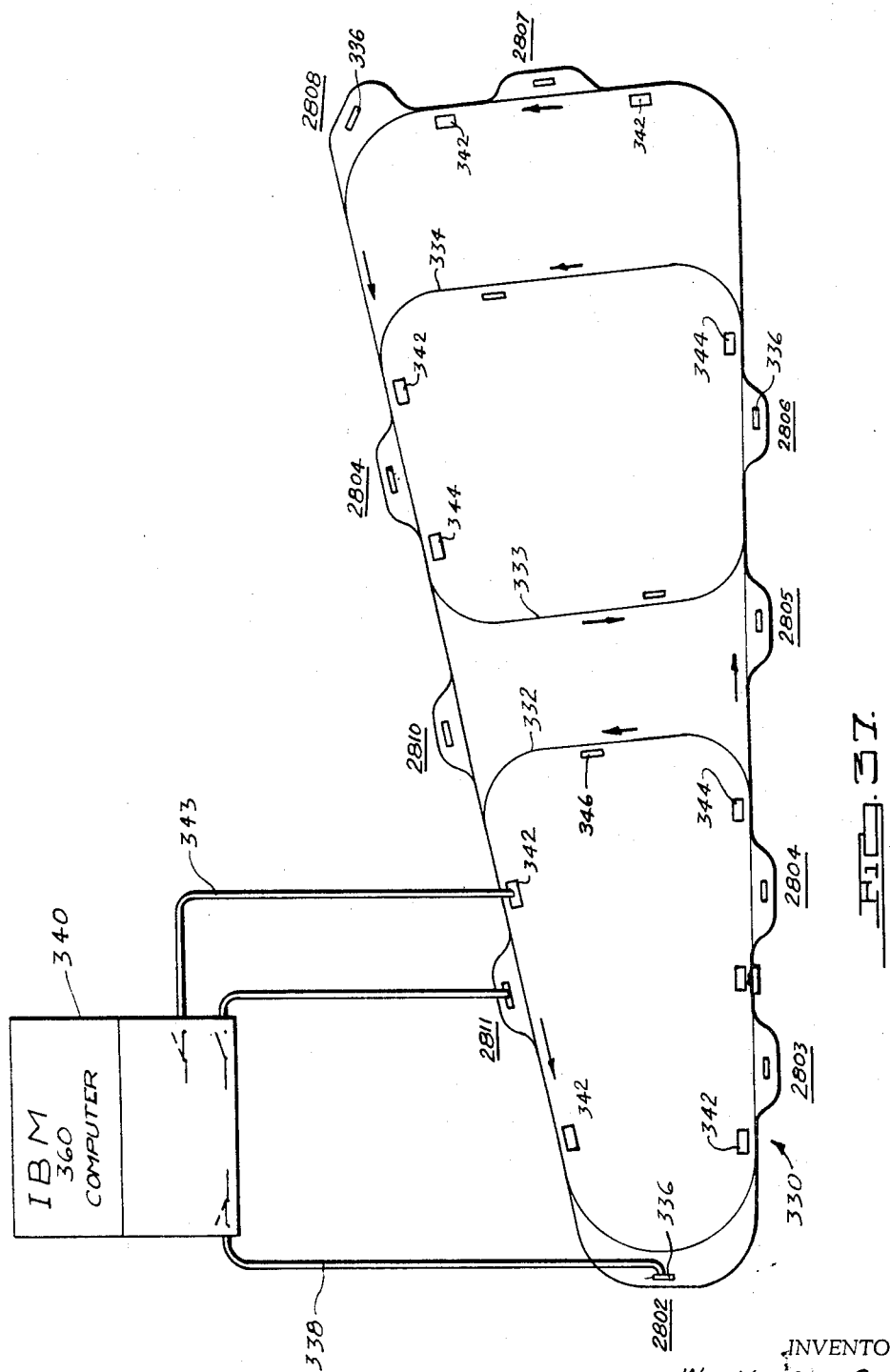

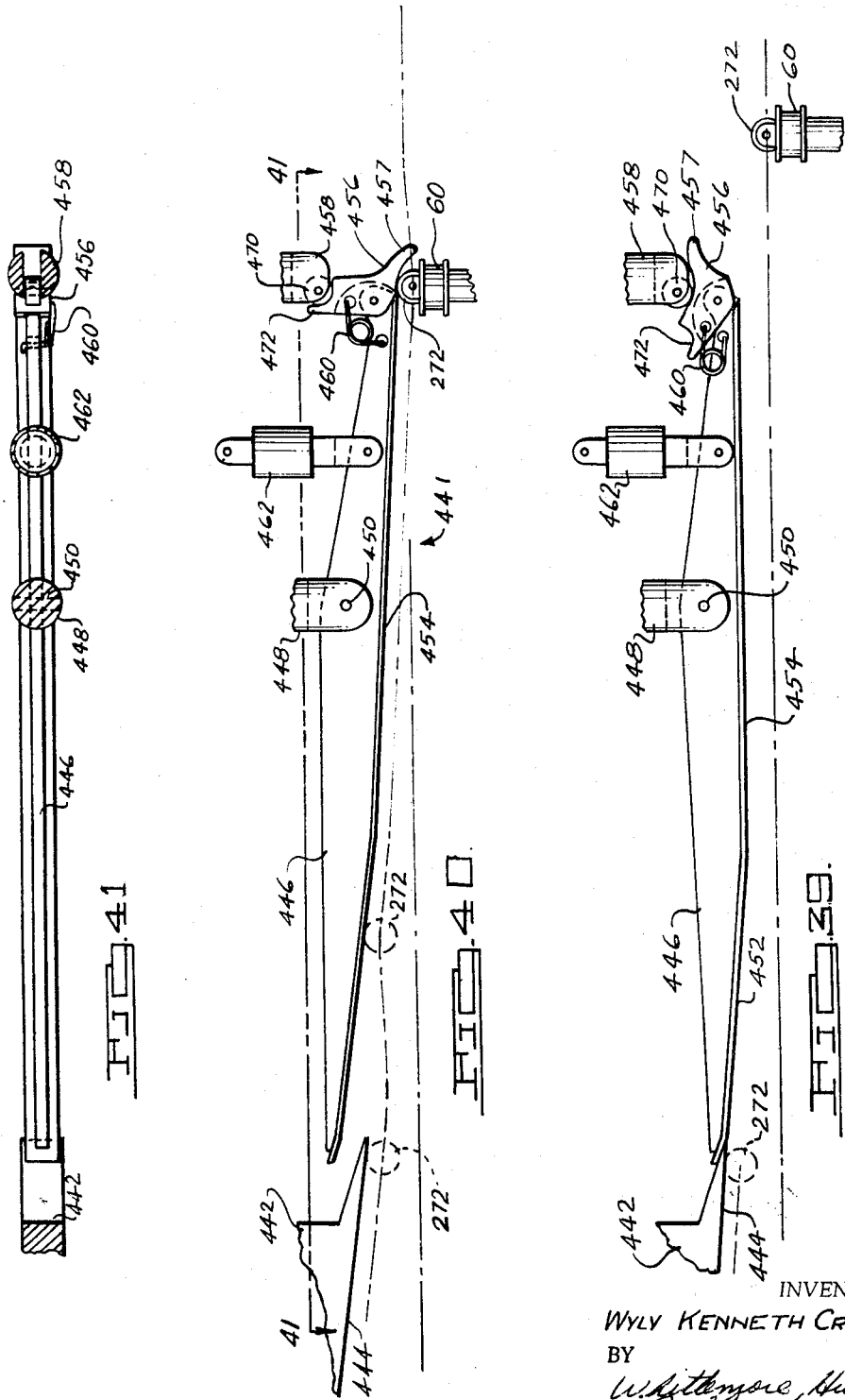

3,403,634
AUTOMATICALLY CONTROLLED RAILWAY PASSENGER VEHICLE SYSTEM

Wyly Kenneth Crowder, Pontiac, Mich., assignor, by mesne assignments, to Docutel, Inc., Dallas County, Tex., a corporation of Delaware
Filed July 22, 1964, Ser. No. 384,444
16 Claims. (Cl. 104—138)

ABSTRACT OF THE DISCLOSURE

An automatic transportation system having vehicles remotely controlled for effecting vehicular traffic between stations.

The system involves a closed main loop arrangement with the vehicles travelling at a substantially uniform speed. At intervals, the vehicles are automatically switched to and from preselected stations located on spur loops, such that traffic on the main loop is undisturbed.

The method of propulsion of the vehicles is controlled and substantially located exteriorly of the vehicles per se.

---

This invention relates to an automatically controlled vehicle system primarily designed to relieve the growing transportation congestion in urban areas and relates more particularly to a completely automatic, private, destination selected, electronically chauffeured vehicle system. The present invention provides a novel concept relating to the method of individual mass transportation, the system involved combining certain of the advantages of automobile traffic with the nonstop movement of rail traffic such as trains. Although this invention is primarily designed for the transportation of people, it should be understood that it can be utilized to transport freight along predetermined paths.

A primary purpose of this invention is to transport people or freight in a most convenient, highly desirable and comfortable manner utilizing a minimum amount of route space and requiring a minimum amount of travel time. Thus the invention is characterized by the feature of making optimum use of time and space in regards to passenger time and route space respectively.

The various transportation systems presently employed in urban areas and elsewhere throughout the United States have many built-in disadvantages which are functions of their basic designs. No single system presently in use satisfies all of the requirements of the public and in particular the individuals thereof in regard to cost, convenience and more particularly passenger time and the public route space required. Some of the transportation systems presently in use were designed over a hundred years ago. Such systems are adequate in some cases. However, in other cases the systems are inadequate due to the demand placed upon them by the members of the public. Street cars and trains operating in and around or between urban areas move along predetermined railed paths. While trains and street cars have increased their speed of travel during recent years, the net gain has been lost in the longer routes which have been required. This type of transportation system involves movement of "groups" of people, generally thirty or more, and the vehicle utilized therein must stop to load or unload even a single passenger from the street car or train, as the case may be. Thus the continued starting or stopping of the street car or train is a distinct disadvantage and inconvenience to members of the public.

Many street car lines have been replaced by buses. In addition, with the increased use of automobiles, the advent of the modern federal expressway system and also the increased use of aircraft, the use of street cars as well as trains has continually decreased. In particular, automobiles have become more popular than street cars and the like due not only to the fact that members of the public have more economic means available for acquiring such vehicles, but also because the automobile will take the driver and passengers where they wish to go in a reasonable period of time. In addition, the automobile is generally always available and thus has the distinct advantage over a street car and a train which generally run periodically.

Supersonic airplanes and in fact any type of airplane will take a passenger from airport to airport in a relatively short period of time. However, it is difficult and sometimes extremely time consuming for a passenger to travel from an urban area to an airport which is generally located many miles from the core city. Thus, while traveling by commercial airplanes is becoming extremely popular, it should be appreciated that a commercial airplane will only take a person almost to his destination in a short period of time. It generally does not take a person exactly to the place where he wants to go.

Monorails, elevateds, overheads and the like are in use today in various urban areas. However, such systems have many disadvantages including switching vehicles, route space required, and in particular cost of construction, maintenance and operation.

Thus the systems presently in use have certain advantages. However, such systems also have disadvantages which are particularly inconvenient during the critical hours of use.

While the present transportation systems have been improved in recent years, such improvements have merely related to a change of timing or route. There is generally no alternative since each of the systems is limited by the very basic design thereof.

The present invention has overcome many of the problems inherent with the transportation systems mentioned previously. The automatically controlled vehicle system of the present invention provides features relating to low construction, maintenance and operational costs, short travel time, convenience, minimum of waiting time and in addition provides vehicles designed to provide privacy for the passengers. The automatically controlled passenger vehicle system of the present invention comprises a stationary tubular elongated endless conduit constructed and arranged in the form of a substantially closed loop, with the tubular conduit being adapted to be supported above, alongside or beneath present transportation facilities, or along entirely new routes. Each closed loop of the transportation system is adapted to operate at a substantially fixed speed. It is anticipated that for one mile of a closed loop there will be approximately 240 vehicles, each vehicle having a length of approximately 10', adapted to move therethrough at a substantially fixed speed. With such a system the vehicles will literally run bumper to bumper in a closed loop at a generally high rate of speed with a minimum of space between the vehicles as determined by the demand placed upon the system. When a car or vehicle enters the main loop from a spur loop it does so at or near main loop speed and only after the vehicle vacates the main loop is the vehicle allowed to slow down.

Each closed and endless main loop will include one or more loading stations and one or more discharge or unloading stations on spur loops. Rail means, generally in the form of a pair of parallel tracks or rails, is mounted along and substantially enclosed by the bottom of the conduit and arranged in substantially an endless path, with additional side tracks or rail means extending through and/or terminating at the various loading and unloading stations so as to permit ingress and egress of the vehicles respectively. The vehicles of the type mentioned previously are all computer controlled and are mounted along the track means for movement through the endless conduit loop between selected ones of the stations. The present invention also includes unique power driven means which are interposed between the tracks and the vehicles for propelling the vehicles along the tracks between selected stations. The invention is also characterized by the provision of an electronically controlled computer which is operatively connected to the vehicles for switching and controlling the velocity thereof. With such a construction, the power driven means, upon signals from the computer, is effective to propel the vehicles through the conduit loop from one of the loading stations to one of the unloading statins as determined by and under the control of the computer.

Thus the automatically controlled vehicle system of the present invention may be briefly described as a substantially closed structural conduit arranged in the form of an endless loop and through which a plurality of electronically controlled vehicles are moved at substantially the same relative constant speed, as will be explained in detail hereinafter.

The conduit, which is arranged in the form of an endless closed loop, is provided along the bottom wall thereof with a plurality of longitudinally extending parallel tracks which are partly enclosed by said bottom wall. The conduit is also provided in the side walls thereof with a plurality of windows. The vehicles of the present invention are constructed and arranged to handle one or two passengers in a comfortable and dignified manner. As an example, each car may be provided with two seats facing one another with the vehicles having windows provided therein, such that upon the movement of the vehicles through the closed loop, the windows in the car and conduit will afford unusual views of the city or surrounding area from generally tree top level.

While the closed loop transportation system of the type described previously may be used or take different forms, it is anticipated that one of the forms will consist of a passenger entering a loading station, such as a side tube, either at the upper main tube level or below at the surface level. Underground stations would be determined by site limitations. After entering the first vehicle in line, the passenger selects his destination, the door of the vehicle closes and the vehicle proceeds automatically to the previously selected point or unloading station. The speed of the vehicle is predetermined by the design of the system, but each loop propels all cars at substantially the same speed. Each vehicle is constructed and arranged whereby a person rides in comfort wtihout having to control the vehicle such as in the case of an automobile, and without having to observe additional persons in close proximity to him as is generally the case with buses, trains, monorails and the like. Thus the computer controlled closed loop vehicle system of the present invention opens new horizons in transportation not heretofore achieved.

The present invention has considerable merit in that the system can be constructed and arranged at generally no loss of tax base to the city necessitated by the removal of buildings. In addition, the system does not create a relocation problem for the members of the community. The system also improves the appearance of the city. Finally, the cost per mile for installation and operation of the system is extremely low.

It is an object of the present invention to provide a new and improved method and system of transportation.

Another object of the present invention is to provide an automatically controlled vehicle system comprising a stationary tubular elongated endless conduit which is constructed and arranged in the form of a substantially closed loop, the conduit having at least one loading station and at least one unloading station, rail means extending lengthwise through the conduit loop closely adjacent to the floor thereof, computer controlled vehicles mounted on the rail means for movement through the conduit loop between the stations, power driven means interposed between the rail means and the vehicles for propelling the vehicles along the rail means between the stations, and an electronically controlled computer operatively connected to the vehicles for switching and controlling the velocity thereof, said power driven means upon signal from the computer being effective to selectively propel each of the vehicles from the loading station to the unloading station as determined by and under the control of the computer.

Still another object of the present invention is to provide an automatically controlled vehicle system of the aforementioned type wherein the power driven means upon another signal from the computer is effective to selectively propel each of the vehicles from the unloading station to the loading station as determined by and under the control of the computer.

A further object of the present invention is to provide an automatically controlled vehicle system of the aforementioned type wherein the conduit of the present invention is provided with a plurality of loading stations and a plurality of unloading stations, with additional rail means being provided extending from the rail means in the loop to the various loading and unloading stations to effect ingress and egress of the vehicles with respect to the closed loop as determined by the computer.

A still further object of the present invention is to provide an automatically controlled vehicle system of the aforementioned type wherein the vehicles employed in the vehicle system are completely enclosed by said conduit so as to protect the interior of the conduit and the vehicles from rain, snow, hail and other weather-like elements. The vehicle system is continuously operative regardless of the weather conditions of the particular area and thus provides an important advantage over air travel and automobile travel at particular times.

Another object of the present invention is to provide an automatically controlled vehicle system of the aforementioned type wherein the system comprises one or more cross-over passages or conduits between various segments of the closed loop, whereby the vehicles operating in the conduit may be automatically rerouted at preselected times to various stations where they are needed by traveling over the cross-over conduits without having to completely traverse the conduit loop.

Still another object of the present invention is to provide an automatically controlled vehicle system of the aforementioned type wherein the vehicles in the conduit may be removed from the main loop or line without substantial change in velocity until the vehicle enters a spur loop containing a station or terminal and begins to accelerate or decelerate depending on whether the station is a loading station or unloading station respectively.

Still another object of the present invention is to provide an automatically controlled vehicle system of the aforementioned type wherein the power driven means is adapted to maintain nearly uniform velocity for all vehicles in the main line of the loop.

A still further object of the present invention is to provide an automatically controlled vehicle system of the aforementioned type wherein the power driven means comprises a plurality of closed fluid circuits for delivering the driving force to the vehicles.

Another object of the present invention is to provide an automatically controlled vehicle system of the aforementioned type wherein the power driven means comprises an electromagnetic means which is interposed between the vehicles and the rail means.

Still another object of the present invention is to provide an automatically controlled vehicle system of the aforementioned type wherein computer controlled switch means are provided for switching the vehicles from the conduit loop to a selected one of the unloading stations.

A further object of the present invention is to provide a new and improved computer controlled vehicle which is movable on rails.

A still further object of the present invention is to provide a vehicle of the aforementioned type which is provided with telescopically arranged ends for absorbing the impact from an adjacent vehicle upon collision thereof.

Another object of the present invention is to provide a new and improved computer including the electrical circuit thereof for controlling the switching of railed vehicles.

Still another object of the present invention is to provide a novel linear electromagnetic motor drive.

A further object of the present invention is to provide a novel structure mounted in the various sections of the conduit loop for cooling the linear electromagnetic motor drive.

It is thus another object of this invention to provide a simplified low cost structure of the aforementioned type having certain advantages contributing to efficiency, reliability and long life as well as ease of maintenance.

Further objects and advantages of the present invention will be apparent from the following description, reference being had to the accompanying drawings wherein a preferred form of the present invention is clearly shown.

FIGURE 1 is a schematic plan view of the endless conduit loop system illustrating therein a plurality of series of vehicles which are under the control of an electronic computer, and further illustrating a combined loading and unloading station for permitting ingress and egress of the vehicles from the conduit loop.

FIGURE 3 is a vertical view of a portion of the longitudinally extending conduit system and illustrating one way of mounting the various sections of the conduit system above the expressway by means of longitudinally spaced arches or supports which span the expressway, with the conduit sections extending beneath the underside of the longitudinally spaced arches.

FIGURE 4 is a view similar to FIGURE 3 but illustrating the longitudinally extending conduit system as mounted above the top surface of the arches or supports.

FIGURE 5 is a fragmentary side elevation, with the conduit removed, showing a single vehicle mounted on the tracks and means for propelling the vehicle, said means being in the form of an air operated flexible-tube drive.

FIGURE 6 is a rear elevation of a vehicle taken substantially on the line 6—6 of FIGURE 5 and illustrating in particular the vehicle drive roller or axle on the air operated flexible-tube drive and the roller hubs on the opposite end portions of the roller or axle locked in the "C" rails.

FIGURE 7 is a schematic view of one of the air operated flexible-tube drive systems, with the systems being provided with bleeder lines and a pump, and further illustrating the principle of how the vehicles have a natural tendency to contact one another upon operation of the air operated drive system.

Figure 8:
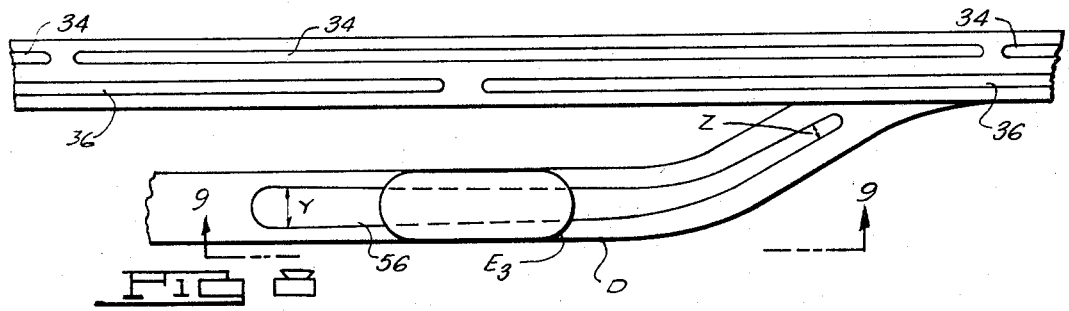

FIGURE 8 is a fragmentary plan view of a section of the system, with the conduit removed, and illustrating in particular the tracks on which the vehicles move, a station, and an accelerating air operated drive system at the station, and in particular illustrating the offset arrangement of the independently operated flexible-tube drive units, and further illustrating the decreasing width of the accelerating air operated flexible-tube drive unit.

Figure 9:
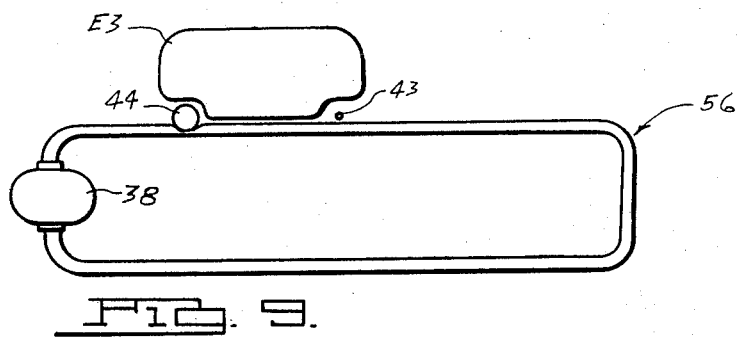

FIGURE 9 is a side elevation of the accelerating air operated flexible-tube drive taken substantially on the line 9—9 of FIGURE 8.

Figure 10:
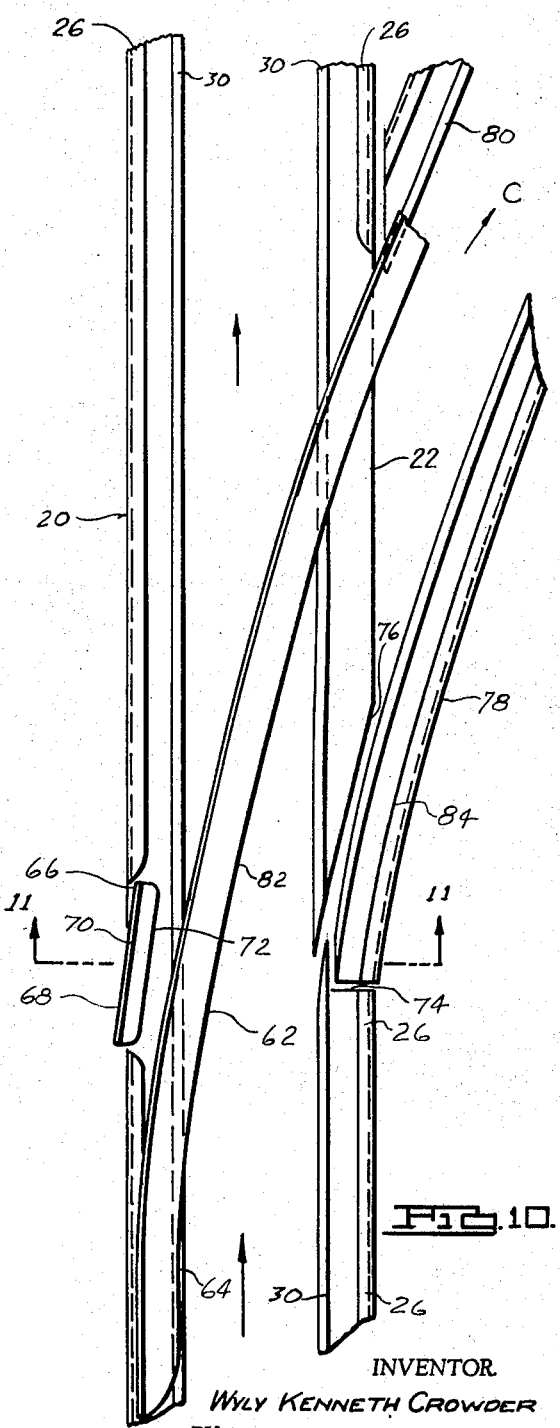

FIGURE 10 is a fragmentary plan view of the automatically controlled vehicle system, with the conduit removed, and illustrating in particular the permanent switch, rails, overhead cam rail, and the lower switching cam.

Figure 11:
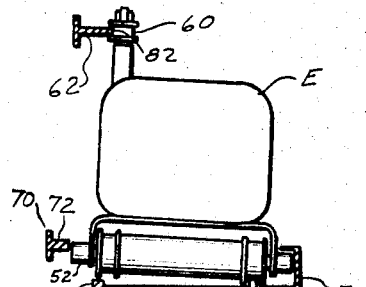

FIGURE 11 is a sectional view taken substantially on the line 11—11 of FIGURE 10 and illustrating in particular the switching mechanism and the cam follower of the vehicle in the raised position and in engagement with the overhead cam rail, and further showing the vehicle canted or tilted with the lower switching cam in engagement with the wheel axle or roller of the vehicle.

FIGURE 12 is a fragmentary vertical sectional view through one portion of the conduit loop and illustrating in particular a novel linear electromagnetic motor drive interposed between the rails provided in the conduit loop and the vehicle, and further illustrating the vehicle in elevation, with portions of the vehicle removed to illustrate features of the invention.

Figure 13:
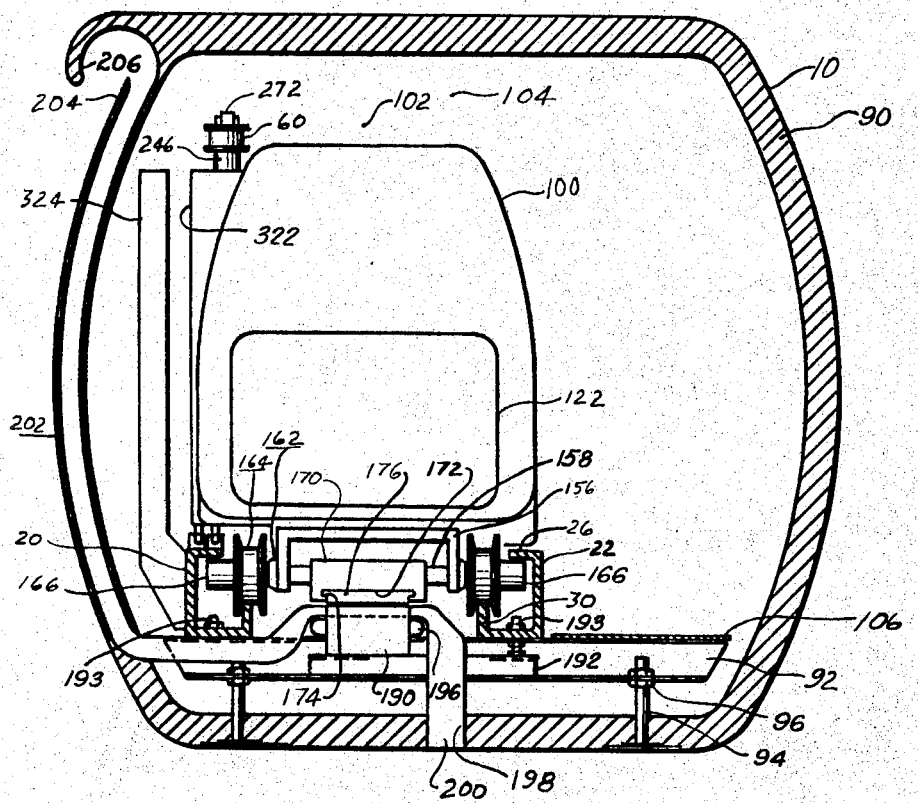

FIGURE 13 is a transverse sectional view through the section of the conduit illustrated in FIGURE 12 and illustrating in particular the air cooling duct for facilitating the removal of heat from the linear motor drive.

Figure 14:
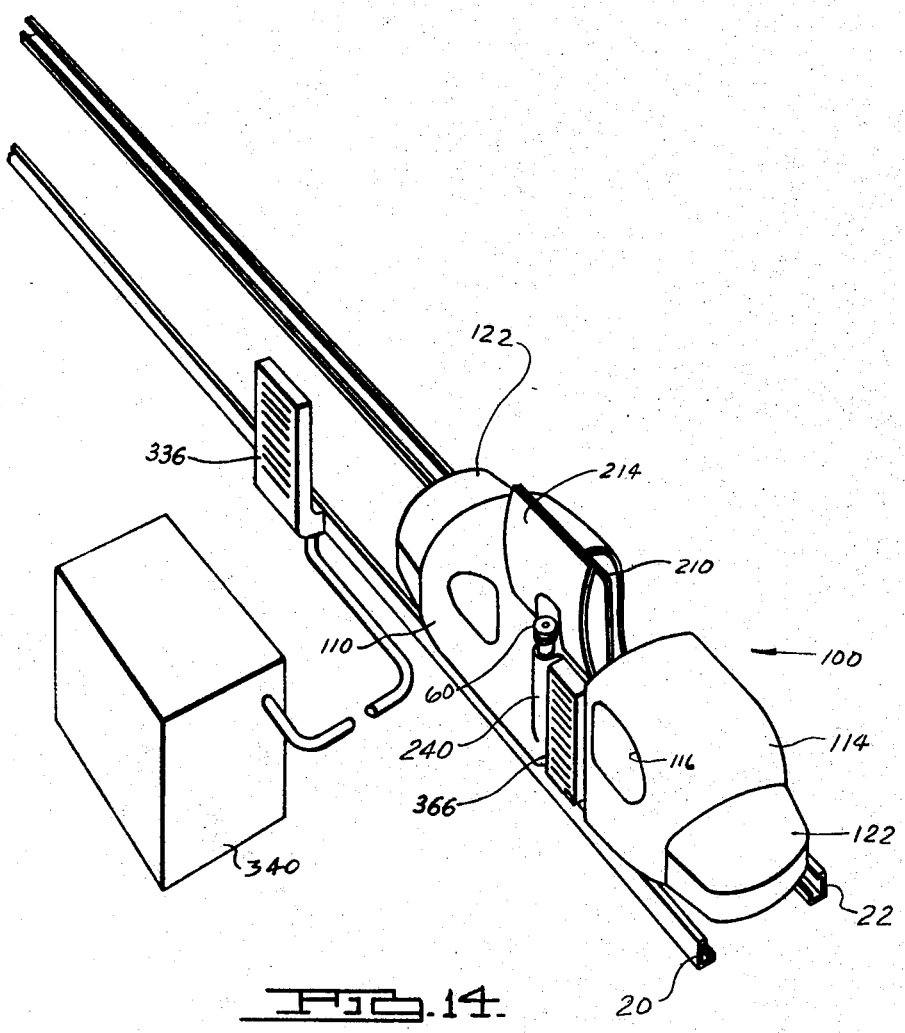

FIGURE 14 is a pictorial view, with the conduit removed, illustrating a vehicle on a pair of substantially C-shaped tracks and further illustrating the vehicle at an unloading station.

Figure 15:
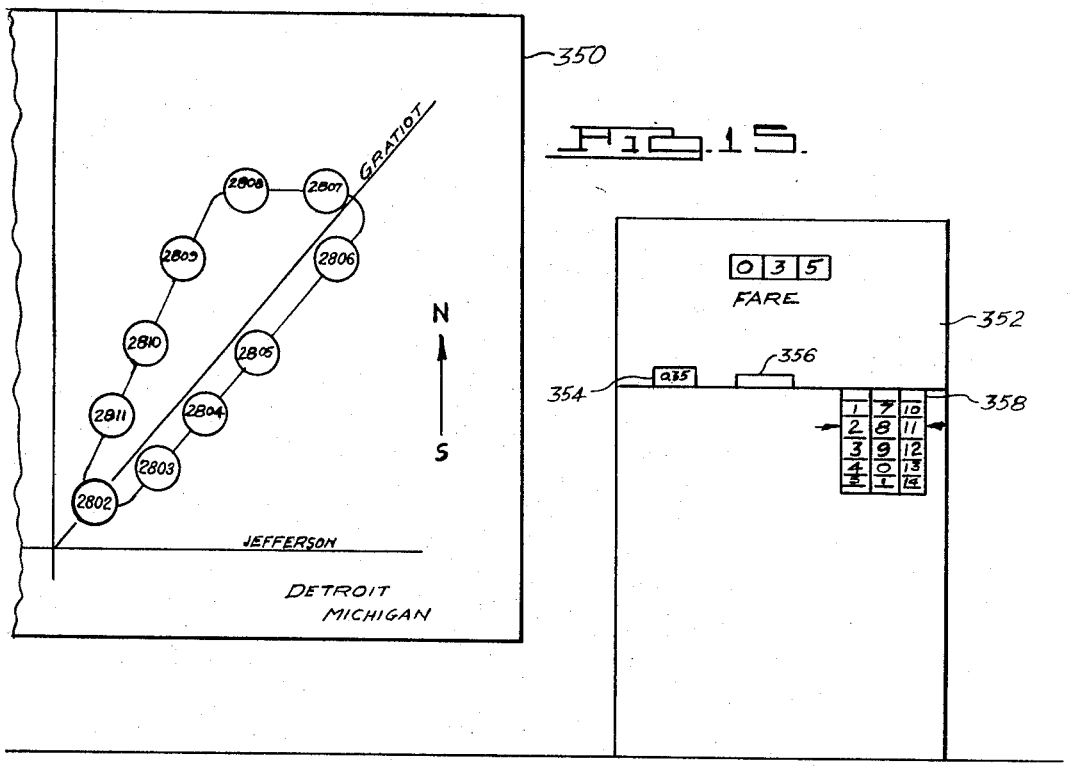

FIGURE 15 is a front elevation of a proposed route map and fare box.

FIGURE 16 is a fragmentary end view of a portion of the vehicle, with the vehicle door in a raised position, and illustrating in particular one of the vehicle electrical control panels attached to the vehicle.

FIGURE 17 is a side elevation of the vehicle electrical control panel looking substantially in the direction of arrows 17—17 of FIGURE 16.

FIGURE 18 is a side elevation of the punch card control box taken substantially on the line 18—18 of FIGURE 16.

FIGURE 19 is a front elevation of one of the stationary electrical control panels which is appropriately mounted on the interior of the conduit loop, with the panels being mounted at longitudinally spaced points in the loop.

FIGURE 20 is a side elevation of the stationary electrical control panel taken substantially on the line 20—20 of FIGURE 19.

Figure 21:
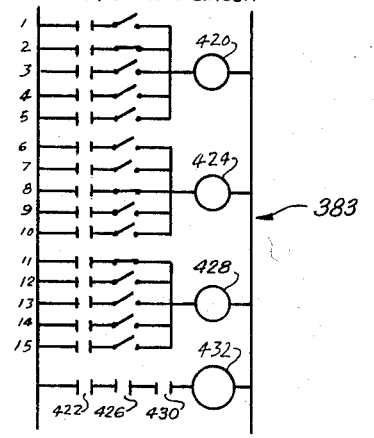

FIGURE 21 is an electrical vehicle photo-cell circuit.

Figure 22:
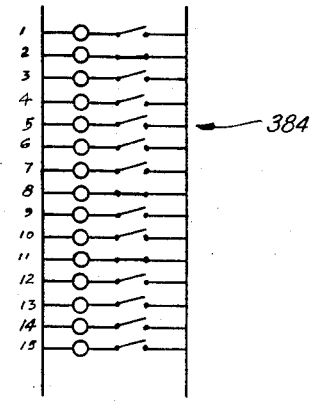

FIGURE 22 is an electrical vehicle light circuit.

Figure 23:
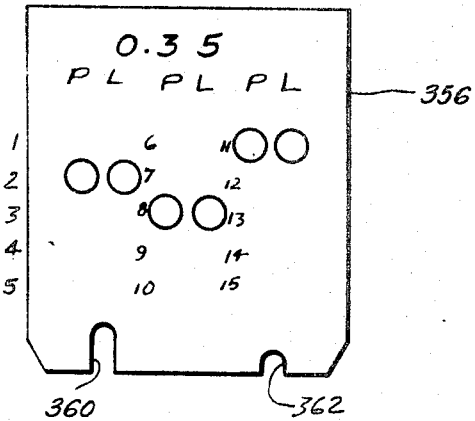

FIGURE 23 is a plan view of the computer control card after it has been punched, so as to indicate thereon the preselected station destination.

FIGURE 24 is a plan view of the punch card control box which is located in the interior of each of the vehicles.

Figure 25:
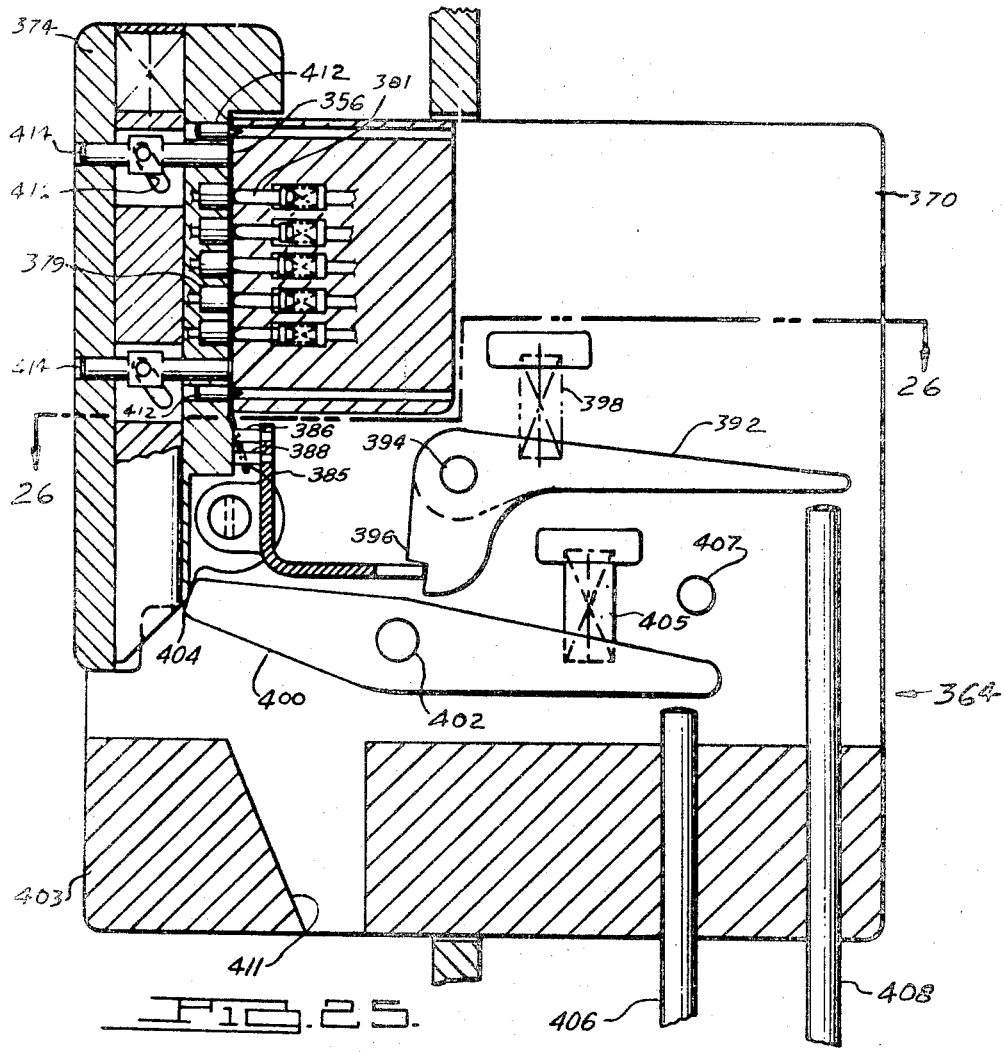

FIGURE 25 is a vertical sectional view taken substantially on the line 25—25 of FIGURE 24, and illustrating a punch card therein in an operative position.

FIGURE 26 is a horizontal sectional view taken substantially on the line 26—26 of FIGURE 25.

Figure 27:
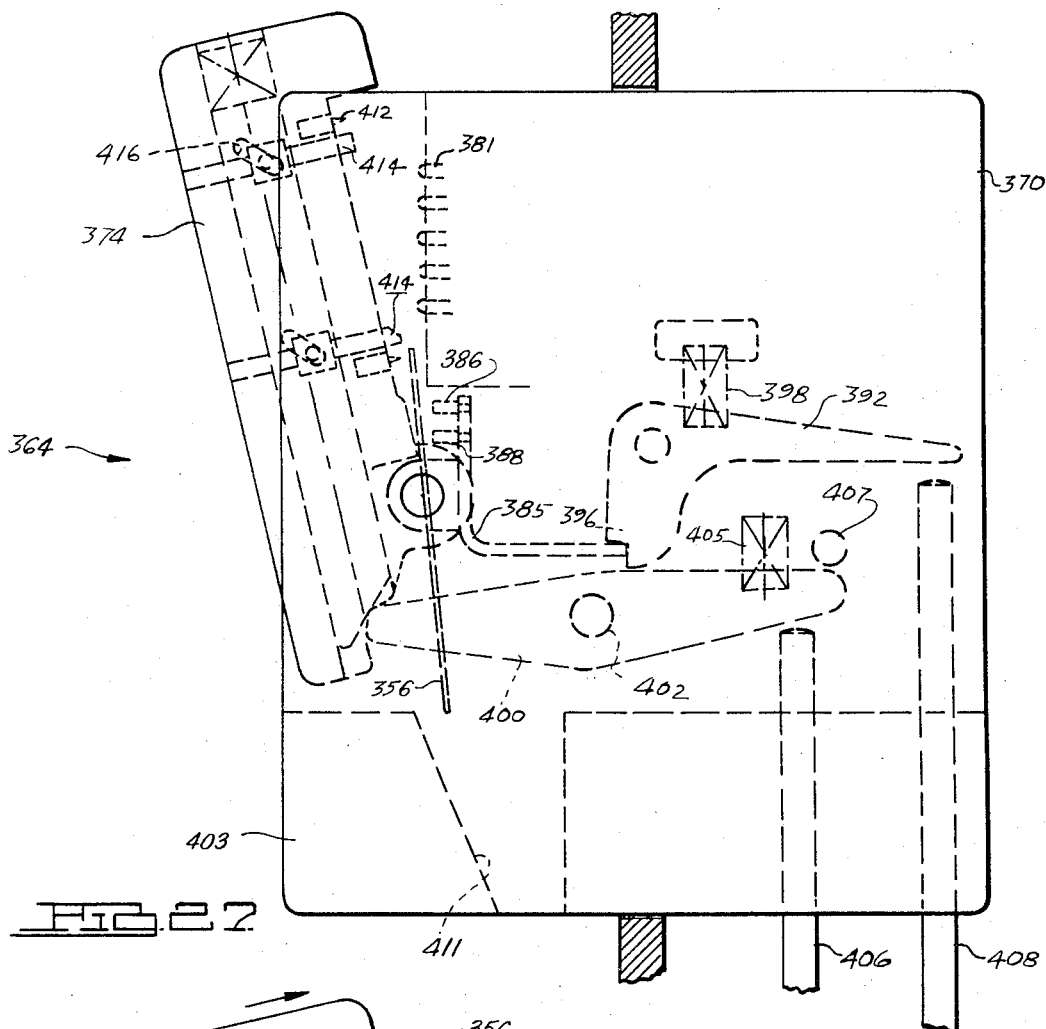

FIGURE 27 is a side elevation of the punch card control box, with the clapper in an open position ready to discharge a punch card and further illustrating the release mechanism.

Figure 28:
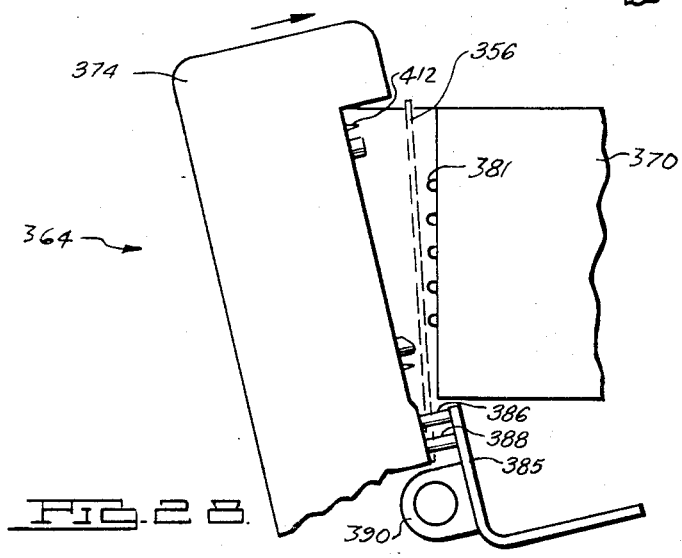

FIGURE 28 is a fragmentary side view similar to FIGURE 27 and illustrating the clapper of the control box in an open position, with a punch card inserted therein.

FIGURE 29 is a fragmentary side elevational view of one of the vehicles, with the door in a raised position, with parts broken away so as to illustrate the means for actuating the overhead cam.

FIGURE 30 is a sectional view taken substantially on the line 30—30 of FIGURE 29 and illustrating the door in a raised position along with the mechanism for raising and lowering the door.

FIGURE 31 is an enlarged fragmentary view of the mechanism for opening and closing the door of the vehicle of the type shown in FIGURE 30.

FIGURE 32 is a sectional view taken on the line 32—32 of FIGURE 29.

FIGURE 33 is an elevational view, partly in section, illustrating the mechanism for actuating the overhead cam of the vehicle.

FIGURE 34 is a fragmentary view of a portion of the linkage mechanism illustrated in FIGURE 33 and illustrating the mechanism in a position prior to the raising of the overhead cam of the vehicle.

FIGURE 35 is a view taken substantially on the line 35—35 of FIGURE 33 and illustrating the overhead cam of the vehicle in a raised position.

FIGURE 36 is an electrical circuit of the photo-cells and lights in the stationary panel.

FIGURE 37 is a diagrammatic view of a closed loop system, with the various stationary computer panels and the computer.

FIGURE 38 is an electrical circuit of the lights in the stationary panel.

FIGURE 39 is a front elevation of the resetting cam in a latched position so as to permit a vehicle, with its cam follower lowered, to pass under the resetting cam with clearance.

FIGURE 40 is a front elevation of the resetting cam in an unlatched position to reset the raised cam follower on the vehicle.

FIGURE 41 is a top view of the resetting cam, partly in section, taken on the line 41—41 of FIGURE 40.

Broadly stated, the present invention relates to an automatically controlled vehicle system comprising a series of vehicles which will travel through a structurally supported tube or conduit arranged in the form of a closed loop, the conduit being supported above, alongside or beneath present transportation facilities or along entirely new routes. The placement of the tubes or conduits may be over roads, side roads, over buildings, through buildings, around buildings, cross country, over expressways, or underground, with appropriate supports as will be subsequently described.

The vehicles which are designed for one or two passengers will travel through the closed loop in a controlled environment at substantially uniform speed without regard for variabilities in the weather and dependence upon good conditions to maintain the best travel conditions.

Referring now to the drawings, FIGURE 1 illustrates one form of a closed loop system designated by the letter A. The exact form of the closed loop system is dependent upon its location and its environment. The closed loop A comprises a series of structurally connected conduits or tubes, which are made, as an example, from light weight material such as aluminum, arranged in an endless path and having means for permitting the ingress and egress of vehicles to and from the loop respectively such as by means of a combined loading and unloading station designated by the letter B. As an example, each of the aluminum conduits or tubes in cross-section is six feet in height by seven feet in width and has a rounded substantially rectangular cross section as best illustrated in FIGURE 13. The tubes, as an example, are constructed in twenty foot lengths and are structurally connected end to end by means of rivets, bolts, welding or the like. Due to the fact that the closed conduit system A completely encloses the vehicles moving therein, elements such as rain, sleet, snow, ice and fog do not interfere in any manner with the operation of the system.

Figure 2:
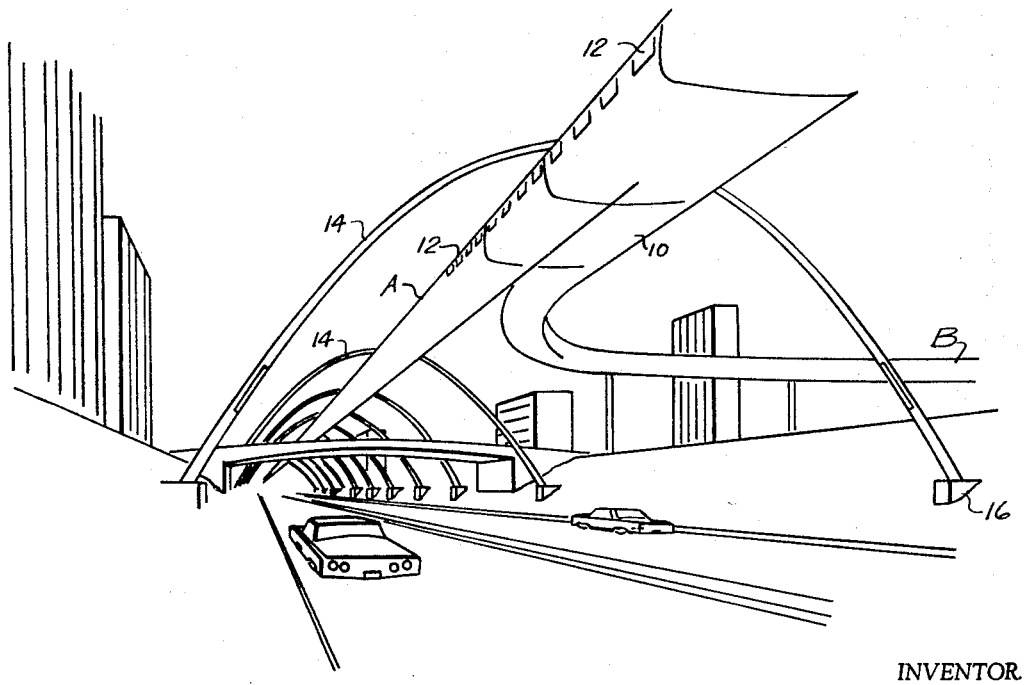
FIGURE 2 is a pictorial view illustrating a portion of the endless conduit loop system and illustrating means for supporting the conduit system above an already existing thoroughfare such as an expressway.

Each conduit section designated by the numeral 10 is provided with a plurality of windows 12 as shown in FIGURE 12. The closed loop A may be located over roads, along side roads, over buildings, or over expressways, as mentioned heretofore. When the closed loop A is supported over an expressway as illustrated in FIGURE 2, preformed concrete arches 14 are utilized. The arches 14 are longitudinally spaced apart, as an example, every forthy feet, with the opposite ends of the arches being appropriately mounted and anchored in a concrete support or base 16 as best illustrated in FIGURE 3. The various sections 10 of the closed loop A are appropriately connected to the arches 14 by appropriate fastening means, not shown, such as extra heavy bolts or the like. The closed loop A may be located underneath the lower surface of the arches 14 as best illustrated in FIGURE 2 or may be located above the top surface of the arches 14 as best illustrated in FIGURE 4. It should be appreciated that various types of structural supports may be utilized in supporting the closed loop A above an expressway or roadway. When conditions permit, structural I-shaped concrete or steel beams may be utilized which are located along the center mall of the expressway or roadway. In addition, single pillar type supports or "A" frames may be utilized as well as inverted U-shaped supports. It will also be appreciated that the supports 14 may be made from aluminum, steel, concrete, or other structural supporting materials. The closed loop A may be located at any desirable height depending on the particular environment or as mentioned previously may be located even underground as the conditions dictate. With the conduit system illustrated in FIGURE 2, it should be appreciated that the present invention is particularly adaptable with present available roadway and expressway facilities, without having to tear down or remove buildings and the like. This has a particular advantage in that additional land and buildings do not need to be condemned and thereby result in a tax loss to the particular municipality involved.

The closed loop A may have a plurality of loading and unloading stations depending on the particular application. A pair of loading and unloading stations may be combined into the form of a single station as illustratd in FIGURE 1 or the stations may be located at longitudinally spacd points along the periphery of the loop A. It should be appreciated that the various stations may be located on side or main streets, inside major buildings, on building roofs, at high level, street level, underground, in parking garages, or at shopping centers. A particular feature of the present invention is that the particular unloading stations may be located close to points or places of use which have a heavy density in population.

Referring once again to FIGURE 1, the station B comprises an unloading station C and a loading station D. The closed loop A has illustrated therein a plurality of vehicles E which are of a capacity to comfortably handle one or two passengers as will be hereinafter explained. A closed loop of approximately one mile in circumference will utilize approximately 240 vehicles E. Any number of cross-over passages G may be provided in any closed loop system between various branches of the system. The particular purpose of the cross-over passages is to permit re-routing of the vehicles E upon demand of such vehicles at a particular station. In addition, the cross-over passages permit the controlled routing of the vehicles E in the event of a power failure at a particular portion of the loop A and also serves as an added safety precaution in the system. Thus, while FIGURE 1 illustrates only one loading station and one unloading station it should be appreciated that a plurality of loading and unloading stations may be required as the situation dictates, with one or more cross-over passages or branches being provided between different portions or branches of the closed loop for the reasons mentioned previously.

It should be further appreciated that any system may have a plurality of closed loops A with various connecting passages between such loops to facilitate the transfer of vehicles E, when certain conditions demand, from one closed loop to another closed loop. Each loop will operate at a substantially fixed speed. With such a construction, the vehicles E provided in the loop will substantially run bumper to bumper in the loop at a high speed with no vacancies or space in the loop. When a vehicle E vacates the loop A it does so at the loop speeed and only after the vehicle E vacates the loop A is the vehicle allowed to slow down. Occasional gaps are provided between adjacent vehicles E in the line or loop A for switching or moving vehicles into the loop. Vehicles generally run from one side of the loop A to the other side but a gap must be available, of course, on the entry side. As long as the loop A is only partially full, a gap can be created by minutely slowing down a section of the line, as an example, from 45 miles per hour to 43 miles per hour for a period of ten seconds so as to produce a 30 foot gap in the line. It is thus possible to make entries into the loop from another line of vehicles traveling at speeds of 45 miles per hour at any time with a local change of only 5% or 10% of the main line speed. By designing a closed loop to operate or run at 75% capacity, switch-on of vehicles can always be made at line speed.

The system of the present invention is designed to handle 17,000 vehicles per hour with the suggested volume per line or loop of 9,000 cars per hour. With such a construction, and assuming that each vehicle is designed for two persons it is obviously clear that 34,000 persons can be transported each hour. If it is desired to start and stop the vehicles in the loop system, the capacity would be reduced by a factor of approximately 80. Instead of 17,000 cars per hour, one could expect 212 cars per hour. The factor 80 is based on the fact that 200 feet is required to slow the vehicle from 45 miles per hour at ⅓ g and a maximum of 5 seconds is required to load or unload. Thus, it will be appreciated that a vehicle traveling 45 m.p.h. will travel 330 feet in 5 seconds. Assuming that 200 feet is required for slowing down, 330 feet is required for waiting and in addition 200 feet is required for accelerating to 45 m.p.h. adding up to a 730 foot gap which is required in the line of the loop if the next vehicle behind the example vehicle is to maintain a speed of 45 m.p.h. If an additional safety factor of 5 sceonds is incorporated to prevent adjacent vehicles from colliding, it would require that another 330 feet be provided between vehicles thereby making a total of 1,060 feet (730'+330') between vehicles instead of 13 feet per vehicle at 75% bumper to bumper capacity of vehicles of ten foot lengths as is provided with the present invention.

The above comparison illustrates a particular feature of the present invention by showing how economy in space and time is achieved in the constant speed loop system. In addition, the fact that a minimum route space is required automatically reduces the structure to a minimum requirement. Since full use can be made of the route space provided by a closed loop system, small vehicles or cars can be used and still have a high route capacity. As a further example, a three-way expressway is designed for an automobile capacity of 7,000 cars per hour. A bumper to bumper capacity of 75% of a single line route of the expressway, with ten foot cars, is 17,000 cars per hour. If every automobile had two occupants, the three lane expressway has less capacity than the novel single line constant speed loop system using the vehicles of the present invention.

Also, the structural comparison of the present invention with the expressway system is readily understood by noting that the constant speed loop system requires only a small railroad track approximately two feet wide compared to the forty foot wide expressway. The constant speed loop system also provides the absolute maximum for convenience and safety to the passengers. Since the vehicles switch out of the main line before slowing down, a car can wait indefinitely at a station without effecting the main route speed. In fact, it is desirable to have cars waiting at all stations at all times for passengers to board at their convenience. This means that a car will accelerate into the main line just as soon as the passenger is seated and has inserted his card or destination selector in the control box as will be subsequently described.

With the constant speed loop system, safety is a natural function. Only speed differences are dangerous. A fail safe driving means is therefore a necessity. The present invention illustrates two suitable driving systems or means.

Extending lengthwise through the closed loop A are a pair of longitudinally extending tracks or rails 20 and 22 of substantially C-shaped cross section as shown in FIGURE 6. The tracks are appropriately mounted on transversely extending longitudinally spaced structural supports as will be more adequately described in connection with FIGURES 12 and 13. It is sufficient to say at this time that the tracks 20 and 22 are laterally spaced approximately two feet apart and are arranged in an endless path substantially following the contour of the closed loop A. In addition, tracks are provided which extend through the combined loading and unloading station B. Each of the tracks 20 and 22 comprises a vertical web 24, an inwardly turned horizontal top flange 26 and an inwardly turned horizontal bottom flange 28, the end of the flange 28 terminating in an upwardly turned rail 30 as illustrated in FIGURE 6. The tracks 20 and 22 are made from steel or other appropriate material and are positioned closely adjacent the bottom of the conduits as will be hereinafter explained. The wheels provided on the vehicles E ride along the rails 30.

FIGURES 5-9 inclusive illustrate one power driving system which is in the form of a double air tube drive system for driving or propelling the vehicles. The system includes a plurality or series of pairs of closed pneumatic or gas-operated circuits for driving the vehicles. Each series includes a pair of the circuits arranged in side by side relationship. Each pair of circuits extends for approximately one hundred feet. Thus a closed loop of one mile would have approximately fifty pairs of circuits plus the circuits for the various stations. The circuits in each row are longitudinally staggered as best illustrated in FIGURE 8 to provide each segment of the closed loop with power.

The pair of circuits are designated by the numerals 34 and 36 in FIGURES 5-9 inclusive. The circuits or air drive systems 34 and 36 are located between the transversely spaced rails 30 as best illustrated in FIGURE 6. The air drive circuits 34 and 36, which are spaced laterally apart, each comprises an endless conduit or tube made from flexible material such as polyethylene. As an example Mylar, which is used to make blood vessels, could be successfully used. The material should be tough but flexible and not elastic. The material should be characterized by having the ability to regain its shape after deflection and to withstand high pressures. An air pump or compressor 38 is provided with each of the air drive circuits for moving or driving the air through the closed conduit as best illustrated in FIGURE 7. Each of the air drive circuits or systems 34 and 36 is arranged in the form of a closed loop and is provided, as an example every twenty-four feet, with restricted connecting bypass passages, two of which are shown in FIGURE 7 for illustration purposes and are designated by the numerals 39 and 40. The restricted passages 39 and 40 are provided with flow control or bypass valves 42 of conventional construction.

Prior to discussing the operation of the air drive system it is advisable to briefly describe one of the vehicles E. Each vehicle E is approximately ten feet in length and comprises a body having a front axle 43 and a rear axle 44 of equal lengths but of different cross-sectional area. The rear axle 44 is larger in cross-section than the front axle 43 for a purpose to be subsequently described. The rear axle 44 is reduced in cross section at the end portions thereof, with the end portions being substantially equal in cross-section to the front axle 43. The end portions of the front and rear axles are provided with generally rubber covered wheels 45 and 46 which are of the same size and construction. All of the wheels are provided with side flanges 48 and 50 which help to guide the four wheels 45 and 46 along the rails 30. It should be noted that the aforesaid end portions of both axles 43 and 44 extend laterally underneath the top horizontal flanges 26 of the tracks 20 and 22. The end portions of the axles are in effect rollers which are engageable with the inner surface of the flanges 26 so as to stabilize and maintain the vehicles E in proper position.

Consider for a moment the air drive systems or circuit 34 illustrated in FIGURE 7. The operation of each of the circuits 34 and 36 are the same and threfore it is necessary to describe only one of them. The utilization of two circuits provide a fail safe feature in the system since if one of fthe circuits should fail due to rupture of the conduit or failure of the pump or the like the remaining circuit is constructed and arranged to provide sufficient driving force to the vehicles.

The compressor or pump 38 includes means for sucking or drawing in air from the conduit of the circuit 34 and in addition includes means for replenishing the air in the conduit by pulling in air from the interior of loop A. It should also be appreciated that various types of gases may be used in place of air.

Consider for a moment the vehicles $E_1$, $E_2$ and $E_3$, moving through the conduit 10 and being driven by the air drive system or circuit 34. The rear axles 44 of each vehicle pinches or restricts the plastic tube or conduit of circuit 34 as best illustrated in FIGURE 7. The front axles 43 of the vehicles are spaced above the tubes and thus do not restrict the flow of air. The vehicles when driven by the air system may contact or bump one another but do not physically or mechanically connect together.

As the pump or compressor 38 is rotated or driven it should be appreciated that the highest pressure in the the circuit is at the pump side of the axle 44 of vehicle $E_1$. The pressure of air is effective to drive the vehicle $E_1$ to the right in the direction of arrow in FIGURE 7. As mentioned previously the rear axle 44 of vehicle $E_1$ pinches the tube and thus restricts the air flow through the system. As the vehicle $E_1$ moves to the right the previously pinched portion of the tube returns to its original size and shape. Vehicle $E_1$ will finally contact $E_2$ which is in motion and help to drive $E_2$ to the right.

The pressure in the line between the rear axles of vehicles $E_1$ and $E_2$ drives vehicle $E_2$ to the right. The pressure on the front side of rear axle 44 of vehicle $E_2$ drops off due to the fact that the line between the rear axles 44 of vehicles $E_2$ and $E_3$ is vented through the restricted passage 39 to the return line of the circuit. Once the axle 44 of vehicle $E_2$ moves past restricted passage 39, the vehicle $E_2$ will lose some speed since the line between the rear axles of vehicles $E_1$ and $E_2$ will be connected to the restricted passage 39. However the force of the air on the rear axle 44 of vehicle $E_1$ is effective to move both vehicles $E_1$ and $E_2$ to the right.

It will further be appreciated that vehicle $E_3$ in FIGURE 7 is slowing down due to the fact that the pressure in the line between the axles 44 of $E_2$ and $E_3$ is vented through the restricted passage 39. However the vehicle $E_2$, driven in part by vehicle $E_1$ will contact vehicle $E_3$ and help to drive vehicle $E_3$. The line at the forward side of the rear axle of vehicle $E_3$ is vented to the return line through the restricted passage 40. Thus after the vehicles have contacted each other in the manner just described, the vehicles proceed in a group through the loop A until they reach the appropriate unloading station.

The vehicles are each approximately ten feet in length and three vehicles have a combined length of approximately thirty feet. The restricted passages 39 and 40 are spaced approximately thirty feet apart so as to provide effective grouping of the vehicles and to provide a system for driving the vehicles a substantially constant speed, with changes in speed being the result of the pressure drop in the line previously described.

FIGURE 8 illustrates the manner in which the air drive circuits or systems 34 and 36 are laterally spaced and longitudinally staggered so that the longitudinally extending row of circuits 36 overlap the space between adjacent circuits 34 in the other longitudinally extending row of circuits. In addition, FIGURE 8 illustrates the loading station D leading into the main line. Each loading station and each unloading station is provided with an independent air drive tube system. The loading and unloading stations are each provided with a tapered closed air tube or conduit 56. When the station is a loading station, the tube 56 is arranged and directed as shown in FIGURE 8, with the tapered conduit decreasing in width as the circuit approaches the main line of the closed loop so as to provide an accelerating force for moving a vehicle into the main line. Thus, tube 56 may be referred to as an acceleration tube.

It should be appreciated that the discharge ramp of the main line leading to an unloading station C would also utilize a tapered tube or conduit, but one which is mounted and arranged in the reverse manner, with the tapered conduit decreasing in width from the main line of the loop to the discharge point in the unloading station. Thus the tube when used at an unloading station is referred to as a deceleration tube so as to decrease the speed of the vehicle from the main line to the unloading station.

In particular, FIGURES 8 and 9 illustrate a closed air drive system including the conduit 56 and a pump or compressor 38. The conduit 56 is of varying or tapering dimension decreasing in width from a point designated Y to a point designated Z. The amount or degree of taper, of course, is dependent on how fast the vehicle E is to accelerate. With the present construction, the tapered tube 56 will drive the vehicle E slow at first and then faster as it proceeds towards the main line of the closed loop. The linear velocity of the air in the tube 56 is a function of the cross-section area of the tube 56 divided by the volume of gas or air pumped through the tube multiplied times the pressure of the air. The pump or compressor 38 is of the constant volume type and is commercially available.

It is anticipated that a closed air drive system 34 and 36 will be utilized every 100 feet in the closed loop so as to maintain the efficiency of the driving force and also to minimize pressure drop or losses in the plastic conduit. As shown in FIGURE 9, the rear axle of vehicle $E_3$ pinches and restricts the tube 56. The pressure on the pump side of the axle 44 is effective to move the vehicle $E_3$ from the loading station to the main line at a gradually increasing speed due to the gradually decreasing cross-sectional area of the tube 56. Thus the vehicle $E_3$ will approach the main line at or near main line speed.

Each vehicle E is provided with an overhead cam follower which is vertically actuable and is designated by the number 60. The overhead cam follower 60 is centrally located with respect to the vehicle E so as to distribute the load centrally or evenly over the front and rear axles 43 and 44 of the vehicles E. Means to be subsequently described in connection with FIGURES 29 and 33–35 inclusive are provided for raising and lowering the overhead cam follower 60. The overhead cam follower 60 is energized or raised when the vehicle E is approaching the discharge station D. The overhead cam follower 60 is raised prior to reaching the preselected discharge station D so as to select the discharge or exit tracks for the vehicle. Appropriately mounted within the conduit section of the closed loop adjacent and upstream from each of the discharge stations is an overhead cam rail designated by the numeral 62 in FIGURES 10 and 11. The cam track 62 is arcuate or curved as best illustrated in FIGURE 10. Upon proper signal from a computer to be subsequently described the cam follower 60 is raised so as to pick up and engage the cam rail or track 62 as shown in FIGURE 11.

The overhead cam rail 62, as best illustrated in FIG-

URES 10 and 11 is vertically spaced above and aligned with track 20 for a portion thereof as indicated by the numeral 64. The rail 62 then curves in a direction towards the combined loading station B (FIGURE 1), extending across and spaced from the track 22.

A part of the vertical web 24, and top flange 26 of track 20 is cut away as indicated at 66 at the place directly opposite the complete interruption of the other track 22 as best illustrated in FIGURE 10. A side cam 68 is fixedly located adjacent and spaced above the cut away portion of track 20. The side cam 68 includes a vertical web 70 and a horizontal flange 72. The side cam 68 is constructed and located whereby the roller or end portion 52 provided on the rear axle 44 of vehicle E engages the side cam 68 as the vehicle E leaves the side tracks 20 and 22 as determined and guided by the overhead cam rail 62 and cam follower 60.

The track 22 is split or divided as indicated by the track surfaces 74 and 76. A pair of spur tracks 78 and 80 lead from loop A to the station B. The track surfaces 74 and 76 are spaced apart and shaped to permit the trailing end of track 78 to be inserted therebetween. The tracks 78 and 80 are of C-shaped cross-section as are tracks 20 and 22. The trailing end of track 80 is slightly spaced from track 22. The tracks 78 and 80 extend through the combined loading and unloading station B and finally re-engage the track 26 as indicated at F in FIGURE 1.

The overhead cam rail 62 extends through the combined station C and is provided with a reverse curve to facilitate the entry of the vehicle from the loading station D to the main line or loop. The construction of the leading ends of the spur tracks 78 and 80 and the cam rail 62 where they enter the main loop at point F is based on the same theory of construction as just described.

As the vehicle approaches the preselected station, the overhead cam follower 60 is raised and engages the cam surface 82 provided on the rail 62. As the direction of the vehicle is taken over by the cam rail 62, the vehicle 60 is tilted to the right as illustrated in FIGURE 11. The roller end portion 52 provided on the left end of the rear axle 44 of vehicle E is raised above the top flange 26 of track 20 at the place where the track 20 is cut away at 66. At such time the left roller 52 engages or picks up the side cam 68 to momentarily direct the vehicle to the right as viewed in FIGURES 10 and 11. At approximately the same time the lowered right hand roller 52 on the rear axle of the vehicle E leaves the track 22 and picks up the track 78. Thus the right hand roller 52 is always located under either the top horizontal flange 26 on track 22 or the corresponding flange 84 provided on the track 78.

After the vehicle E has traversed the tracks 20 and 22 under the control of the overhead cam rail 62 and follower 60, the control of the direction of the vehicle is generally taken over by the tracks 78 and 80, with the vehicle assuming an upright, nontilted position. It should be appreciated that the overhead cam rail 62 may extend through the combined station B or be divided into two parts which are located at the places where the vehicle leaves and enters the main loop.

The closed loop A as mentioned previously comprises conduit sections 10 which are secured end to end. The sections 10, which are made from metal, are provided on the inner surface thereof with suitable insulation 90, as best illustrated in FIGURES 12 and 13, such as fiber board, asbestos, glass wool, fiber glass or the like. The insulation 90 is secured to the metal conduit sections 10 by means well known in the art.

The tracks 20 and 22 are supported throughout the loop A by transversely extending, longitudinally spaced supports or cross ties 92 of generally channel shape cross-section. The supports or ties 92 are each spaced above the bottom wall of the loop by means of a pair of bolts or studs 94 and nuts 96. The studs 94 are carried by the section 10 as illustrated in FIGURE 13. The supports 92 are spaced apart every eight or ten feet. The bottom flanges 28 of the tracks engage the top surfaces of and are appropriately connected to the supports or ties 92 by welding, bolts or the like.

It should be noted that the center line 102 of the tracks 20 and 22 and the vehicle 100 in FIGURE 13 is located to the left of the vertically extending center line 104 of the conduit 10 so as to provide sufficient space in the conduit on the right hand side of the vehicle 100 to provide a sidewalk or platform 106 throughout the entire loop A.

The vehicle 100 is different in certain respects from the vehicles E previously described. In particular vehicle 100 is provided with a different type of wheel support and utilizes an electromagnetic type of driving means.

Vehicle 100 is symmetrical and comprises a body 108 made from lightweight metal or plastic material. The body 108 comprises a front section 110, a door section 112, and a rear section 114 constructed and arranged to form a completely enclosed vehicle body. Each section is usually provided with a window 116. Located in the interior of the front and rear sections 110 and 114 are chairs or seats 118 adjacent to windows 116 for supporting passengers. The seats are suitably connected to the frame or body of the vehicle.

The front and rear sections 110 and 114 are each provided with an opening 120 which receives an end cap 122. Located behind each of the seats 118 is a hydraulic or pneumatic dash pot 124. The dash pot comprises a cylinder 126 having a piston and rod 128 movable therein. The cylinder 126 is fastened to a bracket 130 carried by the frame of the vehicle. The outer end of the rod 128 is secured to end cap 122. When adjacent vehicles 100 bump or contact, the end caps 122 telescope with respect to the body 108 and the shock or impact is absorbed by the dash pot 124. With such a construction the impact of adjacent vehicles 100 is usually not transmitted to the passengers.

The bottom wall or floor 132 of the body 108 has front and rear wheel subassemblies 134 and 136 respectively connected thereto. The vehicles E previously described are each provided with a pair of wheels at the front and at the rear thereof. In vehicle 100 two pairs of wheels are provided on each subassembly 134 and 136.

Since subassemblies 134 and 136 are substantially identical only the rear subassembly 136 will be described. The floor 132 is provided with an upwardly turned annular flange 138 which receives an annular bushing 140 provided with a flange 142 which engages the top surface of the flange 138. The bushing 140, which is tubular, is provided on the lower end thereof with an annular spacer 144 which engages the bottom surface of the floor 132. A U-shaped frame 146 is pivotally connected to the body 108 by means of a pivot pin 148 which extends through the bushing 140, spacer 144 and centrally through the frame 146 as best illustrated in FIGURE 12. The pivot pin 148 is provided with a flange 150 which is secured to the frame 146. The parts are maintained in assembled position by means of a pin 152 which extends through the upper end of the pin 148 and a mounting element 154.

The frame 146 is provided on each of the front and rear edges thereof with a pair of laterally spaced flanges 156. The rear flanges 156 are provided with openings for receiving a rear axle 158 while the front flanges carry a front axle 160. Each axle 158 and 160 is provided adjacent the outer surfaces of the flanges 156 with annular bearing elements 162 and rubber covered wheels 164 which ride on the rails 30. The outer ends of each axle 158 and 160 are provided with enlarged end portions or rollers 166 which engage the top flanges 26 of the tracks 20 and 22.

Each wheel subassembly 134 and 136 is provided with an elongated carrier or housing 170 having laterally extending opening therein and through which extend the axles 158 and 160 as best illustrated in FIGURE 13. It is obvious that the carrier 170 is mounted on the axles prior to mounting the axles on the frame 146.

The lower side of the carrier 170 is provided with a slot 172 and a pair of inwardly turned lips 174 as shown in FIGURE 13. An armature 176 of T-shaped cross section is received in the slot 172 and held in place by the inwardly turned lips 174. It should be observed that the carrier 170 and armature 176 are located below the top surfaces on the rails 30.

The trailing end of armature 176 is provided with a bracket 178. A dash pot or suitable dampening device 180 is interposed between the bracket 178 and the outer end of carrier 170 to permit relative lengthwise adjustment and cushioning therebetween upon impact.

The forward end of the armature 176 is provided with a swivel or ball joint or bearing 182 as illustrated in FIGURE 12. An armature 184 is located between the armatures 176 of the wheel subassemblies 134 and 136. The armature 184 is provided on each end thereof with a flange 186 provided with an opening which engages the bearing 182. Each joint or bearing 182 permits rotary as well as up and down adjustments between the armatures 176 and 184.

The front axle 160 of only the rear wheel subassembly 136 is provided with a pair of elongated arms 188 which are supported by the axle 160 on one end and on the other end carries brake shoes 190 which are adapted to frictionally engage the top surface of the rails 30 in a manner well known in the art. The arms 188 and brake shoes 190 are located on opposite sides of the armature housing 170, and armatures 176 and 184. The brakes 190 are applied automatically upon a predetermined signal and frictionally engage the rails 30. The shoes may be made from bronze. It will thus be appreciated that three armatures are carried by each of the vehicles. The armature is a one-piece casting, as an example, made from aluminum cast around an iron gridwork with no moving parts or wiring to fail.

Located generally every eight feet in the loop or line adjacent to the cross ties 92 is a plurality of linear three phase laminated stators, one of which is shown in FIGURES 12 and 13 and designated by the numeral 190. Each stator 190 is approximately carried by a pair of supports 192 which are adjustably secured to the bottom flanges 28 of the tracks 20 and 22 by means of fastening devices 193 as best illustrated in FIGURES 12 and 13. With such a construction, the stator 190 may be adjusted vertically to insure exact location and gap with respect to the armatures on the vehicles 100.

The stators 190 each have a series of upwardly opening slots 194 which receive the windings 196. The armatures, which may be described as a shorted bar rotor, and the linear three phase laminated stator form a linear motor drive system which is based upon the electromagnetic induction principle of a three phase squirrel cage induction motor. Such a construction provides a reliable and dependable method of propelling the vehicles 100.

As mentioned previously the squirrel cage or shorted bar elements are attached to the floor of the vehicle 100. The three phase stator is employed along the track and continuously excited so that a traveling magnetic wave is set up. The squirrel cage motor is magnetically attracted along the standing wave of the stator and provides tractive effort to the vehicle 100 without any electrical or mechanical connections. The stator 190 and the armature of the vehicles are maintained in close proximity to each other. Where required the stator 190 may be adjusted with respect to the armatures as illustrated in FIGURE 13. Reliable proximity is maintained between the track stator and car rotor due to the design of the vehicle 100 and tracks 20 and 22. A constant current supply is required on the stator windings 196 to provide constant thrust to the vehicles 100. The speed of the vehicles 100 is a direct function of the frequency applied to the stator 190 and the coil pitch of the conduits or windings 196 placed in the stator.

The drive system just described approaches the reliability of a three phase squirrel cage motor which is more positive and reliable than other forms of electric or mechanical drive units. The particular advantage of the present system is that a minimum of maintenance and down time is required. In the event that a difficulty does occur, it will always be on the stator 190, which is affixed stationary to the tracks and could be readily repaired by maintenance men with the system in operation. Mechanical failures in wheels, bearings and supporting members of the vehicle represent the only failure possible in the vehicle. The stators or fields 190 are built into the bed of the tracks 20 and 22. If any one of the stators 190 should fail, the vehicles will coast on to the next stator 190 with no appreciable change in speed. The stators 190 can be wired alternately to different power lines so that if one whole power line fails the vehicles will still operate on the other power line at a slightly reduced speed.

Each stator 190 is provided with an air cooling duct 198. The duct 198 includes an entrance 200 at one end of the duct 198 at the place where the duct 198 extends through the bottom wall of the conduit section 10. The duct 198 has a width approximately equal to the length of stator 190 and is constructed and arranged to extend laterally across the top of the windings 192 and then upwardly through the exit or discharge section 202 formed in a side wall of the conduit 10 as best illustrated in FIGURE 13. The discharge or exit end 204 of the duct 198 is partially enclosed by an overhanging lip 206 carried by the conduit 10 to prevent foreign matter from entering the duct 198. Thus the duct 198 provides a chimney whereby cool air entering the duct at the entrance 200 travels across the stator 190 to remove the heat generated thereby and then travels upwardly through section 202 and is finally discharged therefrom at the exit 204.

The vehicle 100 is provided with an overhead cam follower 60 of the type mentioned previously. The follower 60 is centrally located with respect to the vehicle 100 to distribute the load evenly on the wheel subassemblies 134 and 136. The vehicle includes on the interior thereof an emergency button 208 which may be actuated by a passenger to actuate the overhead cam follower 60.

The door section 112 of the vehicle 100 is located between the intermediate body sections 110 and 114. A door 210, as best illustrated in FIGURES 29 and 30, is appropriately mounted in the opening 212 provided in one side of and the top of the body 108. The door 210 comprises a pair of sections 214 and 216 having the inner edges thereof pivotally connected by means of a hinge 218. The outer end of the door sections 214 is pivotally connected to the top portion of the vehicle body 108 to permit raising and lowering of the door 210.

The door section 216 is provided with a pair of laterally extending rollers 220 and 222. Each roller is mounted on a pin 224 fixedly carried by door section 216. A chain or link drive 226 is provided for raising and lowering the door 210 and comprises an endless series of pivotally connected links 228. The links are arranged in laterally spaced pairs connected by a transversely extending pin 230. The lateral space between the links 228 on each pin 230 is adapted to receive the teeth of a sprocket 232 which is connected to the shaft 234 of a drive motor 236 as best illustrated in FIGURE 29. The aforesaid pin 224 which carries the roller 220 is interconnected in the chain drive 226 as best illustrated in FIGURE 32. The other roller 222 is adapted to move in a channel or track 229 (FIGURE 12) provided in the body 108 similar to the track 227 (FIGURE 12) which is provided for roller 220 and the link drive 226.

Upon actuation of a door button, the motor 236 is driven to effect rotation of the sprocket 232. As a result thereof the endless link drive 226 is driven counterclockwise as viewed in FIGURE 30 to move roller 220 through track 227 in a like direction and thus move the door 210 about its pivot to the raised position. During the opening of the door the other roller 222 moves in the corresponding track or channel provided in the body 108 to guide the door 210 and prevent binding thereof. During opening of the door 210 the sections thereof pivot about the hinge 218 to permit the entire structure to be moved to one side of the body 108 to permit a passenger to enter the vehicle conveniently. It should be appreciated that the door 210 is closed by reversing the direction of the chain drive 226. An appropriate button is provided to close the circuit to effect driving the motor 236 in the opposite direction to close or lower door 210 as shown in FIGURE 12.

The gear motor 236 driving the chain or link drive 226 is provided with spur type reduction gears so that the door 210 can be opened in an emergency with a lift of about 25 pounds or less; however, when the small motor 236 is energized electrically, it will require 2,500 pounds of lift to open the door 210. In other words, the gears are not self locking, but a small reverse motor torque will lock the gear train to prevent some one trying to open the door 210. A limit switch, not shown, is provided that turns the gear motor 236 on to close the door 210 when the door 210 is raised a small distance, as an example, ¼". Other than the above safety function of the gear motor 236, its main function is to open and close the door 210. It should be noted that the chain drive 226 to the door rollers 220 and 222 running in the channel never becomes unlatched. The door design provides good head clearance so a passenger can enter the vehicle standing up and can sit down or stand up again without bumping his head, even though the vehicle is only 4' high.

The overhead cam 60 is centrally located and mounted at one side of the body 108. Secured to the outer wall 239 of the door section 112 opposite the door 210 is a tubular elongated housing 240 as shown in FIGURES 16 and 33. The housing 240 is provided with a flange 242 as illustrated in FIGURE 33 which is secured to wall 239 by fasteners 244. Mounted for lengthwise movement in the housing 240 is a plunger 246 provided with axially spaced piston portions 248 and 250 which engage in bore 252 of the housing 240. The plunger 246 has fixedly connected thereto by means of a pin 253 a stem 254 which is spaced from the walls of bore 252 and extends outwardly beyond the lower end of the housing 240. A flange 256 provided on the lower end of the housing 240 defines with the piston 250 an annular spring chamber 258 which surrounds and is concentric with the stem 254. A spring 260 is interposed in the spring chamber around the stem 254 between piston 250 and the flange 256 as illustrated in FIGURE 33.

The lower end of stem 254 is provided with an annular lip or groove 262 which cooperates with suitable actuating means 264, as illustrated in FIGURES 29, 33 and 34, to hold the plunger 246 and stem 254 in their lowermost position (FIGURE 29). The upper end of plunger 246 is tubular (FIGURE 35) and receives an elongated stem 266. The stem 266 is carried by the plunger 246 by means of pins 268. The upper end of the stem 266 is provided with a U-shaped support or clamp 270, the arms of which rotatably support a roller 272 by means of a pivot pin 274. Intermediate the top surface 276 of plunger 246 and the bottom surface of the support 270 is located the aforementioned cam follower 60. It should be appreciated that the cam follower 60 is mounted on stem 266 prior to inserting the stem 266 into the plunger 246 and retaining same by pins 268. The follower 60 is provided with upper and lower flanges 278 which engage opposite sides of the cam rail 62 as illustrated in FIGURE 11.

The actuating means 264 is computer controlled and also adapted to be manually actuated from within the interior of the vehicle. FIGURES 29, 33 and 34 illustrate a solenoid 280 having a plunger 282 therein which extends therethrough. The lower end of plunger 282 is provided with a head 284 to which is pivotally connected a link 286. The link 286 is pivotally connected to a transversely extending link 288 at the center thereof by pin 290. One end of link 288 is fixedly pivoted on pin 292. The other end of link 288 rotatably carries a roller 294. Movement of plunger 282 upon energization of solenoid 280 swings lever or link 288 in an arc about pivot 292.

A link 296 is pivoted on the upper end thereof on pin 298. A latch 300 is pivoted by means of pin 302 to the lower end of link 296 and engages the groove 262 on the stem 254 to hold the stem in a lowered position, with the spring 260 compressed. The latch 300 is provided with an extension 304 which moves in the arc 306. A fixed spring abutment 308 is located beneath the housing 240 and has connected thereto one end of the biasing spring 310. The other end of spring 310 is fixed to spring abutment 312 carried by an intermediate portion of link 296.

A second spring 314 is anchored on one end to link 296 and on the other end to a spring abutment 316. A stop 318 is located at one side of link 296. When the cam 60 is in a lowered position the actuating mechanism is in the position illustrated in FIGURE 29. When the cam 60 is in a raised position the actuating mechanism is in the position shown in FIGURE 33. Upon signal from the computer as will be subsequently described the plunger 282 is moved upwardly to urge the head 284 against solenoid 280 from the position shown in FIGURE 29 to the position shown in FIGURE 33. As a result thereof the roller 294 and link 288 are moved in an arc out of contact with the latch extension 304. Thereafter spring 310 urges the link 296 clockwise against the stop 318 to partially raise the stem 254 through means of the latch 300. Simultaneously spring 314 urges the latch extension 304 in a clockwise direction and swings latch 300 clockwise to effect release of the latch 300 from the groove 262 provided on the stem 254. Thereafter the previously compressed spring 260 raises the plunger 246 to the position shown in FIGURE 11 where the cam 60 engages the cam track 62.

FIGURE 37 illustrates diagrammatically one form of a closed loop system designated by the numeral 330. The closed loop system 330, as an example, comprises ten combined loading and unloading stations designated successively as stations Nos. 2802–2811 inclusive. The closed loop system further includes cross-over passages 332, 333 and 334 which connect opposite segments of the main line or loop. Located at each of the stations 2802–2811 inclusive is a stationary computer panel 336 which is connected by means of lead wires 338 to a master computer 340. As an example, the computer 340 may take the form of an IBM computer No. 360 which is well known in the art. One of the main purposes of the computer 340 is to direct the flow of the vehicles through the closed loop 330 without any traffic jams. This is accomplished by use of various timing devices and switches which sense the traffic pattern and react accordingly to control vehicle flow. In addition, stationary computer panels 342 are located at longitudinally spaced points about the inner periphery of the loop 330. The last-mentioned stationary computer panels 342 are each located a few hundred feet from the entrance to one of the stations and are connected by lead wires 343 to the master computer 340. In addition, stationary computer panels 344 are located in the main loop ahead of the leading ends of the cross-over passages 332, 333 and 334. Stationary computer panels 346 are also located in the cross-over passages 332, 333 and 334 for regulating the flow of vehicles into the main loop. The functions of the various stationary computer panels 336, 342, 344 and 346 will be discussed herein later. It should be noted, however, that all of the computer panels 336, 342, 344 and 346 are usually identical and are connected by lead wires to the computer 340.

Located at each of the stations 2802–2811 inclusive is a route map 350 and a fare box 352 which are illustrated in FIGURE 15. The route map 350 indicates the various stations 2802–2811 inclusive, the location of such stations and other travel information. The fare box 352 includes a coin box or slot 354, a punch card 356, a dial indicator 358 and suitable means, not shown, for punching the card 356 in response to the setting of the indicator 358 and upon the deposit of the fare in the coin box. For purposes of illustration, assume that a passenger at station 2802 desires to travel to station 2811. At this time the passenger places a predetermined fare, for instance, 35¢, in the fare box 354 and rotates or turns the indicator 358 to the particular position so as to indicate the destination-station 2811 as illustrated in FIGURE 15. Thereafter, the card 356 is punched by means not shown, to provide a suitable code on the card 356 which is more adequately shown in FIGURE 23. The card 356 is provided, at the bottom edge thereof, with slots 360 and 362 which are used for a purpose to be later described. It is sufficient to say at this time that the card 356 is punched so as to indicate thereon the particular station to which the passenger wants to go.

The card 356 as shown in FIGURE 23 is numbered 1–15 inclusive. The numbers are divided equally in three rows including the first row Nos. 1–5 inclusive, second row Nos. 6–10 inclusive, and finally the third row Nos. 11–15 inclusive. Each of the rows have a pair of columns lettered P and L. P designates slots or holes for the vehicle photo-cell circuit while L designates slots or holes for the vehicle light circuit. Both circuits are provided with switches located in the destination box 364 of the vehicle. Thus, each number is provided with two squares or boxes which, if punched, permit certain electrical contacts to close in the destination box 364. There are 15 numbers provided on each card 356 with each number having two spaces for a total of 30 spaces. There are a corresponding 30 switches provided in the destination box 364. Fifteen of the switches are interposed in the vehicle photo-electric cell circuit while the remaining 15 switches are interposed in the vehicle light circuit. The punching mechanism located in the fare box 352 will punch the card 356 in six places so as to provide three openings in the column L, one opening opposite numbers 2, 8 and 11 and three openings in the columns P, one of said last-mentioned openings opposite each of the numbers 2, 8 and 11. Thus the card 356 has the route 2811 punched thereon and when inserted in the vehicle's destination box 364 will permit various switches to close as will subsequently appear.

After the card 356 has been punched the passenger enters one of the vehicles and inserts the card 356 in the destination box schematically illustrated in FIGURE 16 by the numeral 364. The purpose of the destination box 364 is to provide a means of communicating to the main line system and the master computer 340 a route designated by the punch card 356. The cards 356 are designed so as to have impressed thereon a code system so that the box 364 includes a novel means of disposing of the cards 356 after they have been used. The destination box 364 further includes means for changing the particular code periodically, as an example, from day to day.

FIGURES 24–28 inclusive illustrate the destination box 364 in various positions. The destination box 364 is appropriately mounted in each of the vehicles and is electrically connected to the stationary vehicle computer panel 366 provided on each of the vehicles. The destination box 364 comprises a housing 370 which includes a top wall, a bottom wall, and four side walls. The destination box 364 includes a clapper 374 which is provided adjacent the lower end thereof with a pair of laterally spaced arms or lugs 376. The clapper is pivotally carried by the housing 370 by means of a pair of pivot pins 378 and 380 which extend through the clapper lugs 376 and the side walls of the housing 370 as best illustrated in FIGURE 26.

The clapper 374 and the housing 370 are each provided with thirty electrical contacts which are arranged in a substantially rectangular pattern corresponding to the 30 square pattern provided on the card 356. Thus the thirty electrical contacts provided on each of the clappers 374 and housing 370 are arranged in six vertical rows, consisting of 5 contacts each. FIGURE 25 illustrates one vertical row of electrical contacts 379 carried by the clapper 374 and one vertical row if electrical contacts 381 carried by the housing 370. FIGURE 24 illustrates schematically the six rows of contacts A–F inclusive in the clapper 374 and housing 370.

The thirty electrical contacts in the clapper 374 have corresponding electrical contacts in the housing 370 so as to form thirty switches. FIGURE 21 illustrates fifteen of the switches in the vehicle photoelectric cell circuit 383 while FIGURE 22 illustrates the remaining fifteen switches in the vehicle light circuit 384. Mounted within the interior of the housing 370 is a code plate 385 which is provided with a pair of pins 386 and 388 which are adapted to be received in the slots 360 and 362 respectively of the punch card 356 as will subsequently appear. The code plate 385 is provided with a pair of lugs 390 which are mounted on the pivot pins 378 and 380 as best illustrated in FIGURE 26. The destination box 364 further includes a lever 392 which is mounted on pivot pin 394. The lever 392 includes a latch portion 396 which is adapted to engage the rotatable code plate 385 as illustrated in FIGURE 25 to retain the code plate 385 in a predetermined position. A spring 398 mounted in housing 370 holds the latch 396 of lever 392 in latching position. The destination box 364 further includes a clapper release lever 400 which is mounted on pivot pin 402. The lever 400 includes a portion 404 in contact with the clapper 374. A spring 405 in housing 370 biases the lever 400 in a direction to hold the clapper 374 in a latched or closed position. Mounted in the bottom wall 403 of the housing 370 is a vertically movable rod 406 engageable with lever 400 to effect release of the clapper 374 and a vertically movable rod 408 engageable with the lever 392 to effect release of the code plate 385. The rods 406 and 408 are arranged in the housing 370 in substantially parallel vertical relationship and include portions which extend outwardly beyond the bottom wall 403 of the housing 370.

The housing 370 includes a discharge slot 410 in the bottom wall 403. The slot 410 is connected to a suitable box or container for receiving punch cards 356 after their initial use. The clapper 374 includes a pair of retainer pins 412 which pick up and engage a card 356 upon closing of the clapper 374. The clapper 374 also includes a pair of adjustable stripping elements or pins 414 to effect release of the card 356 from the pins 412 upon opening of the clapper 374. The stripping elements are adjustably carried by the clapper 374 by means of a pin and slot connection 416.

When a person enters a vehicle the clapper 374 of the destination box 364 is in the opened position illustrated in FIGURE 28. The previously punched card 356, in the present illustration having marked thereon station 2811, is inserted into the destination box 364 until the slots 360 and 362 provided thereon are moved into operative contact with the pins 386 and 388 provided on the code plate 384. Thereafter the clapper 374 is pivoted about pivots 378 and 380 so as to close the clapper 374 and urge the retaining pin 412 through the punch card 356 as best illustrated in FIGURE 25. Simultaneously, the lower end of the card 356 provided with the slots is bent away from the plane of the card as illustrated in FIGURE 25. At such time certain ones of the electrical contacts carried by the clapper 374 and the housing 370 will close so as to complete various electrical circuits as shown in FIGURES 21 and 22.

Located adjacent each of the discharge stations in the closed loop system are a pair of laterally and longitudinally spaced cams 409 and 410 as are illustrated in FIGURES 16 and 17. The cams 409 and 410 are carried by and extend upwardly from the top horizontal flange of the track 20. As the vehicle moves in the direction of the arrow in FIGURE 17, the cam 409 moves or actuates the rod 406. As a result thereof the rod 406 is moved upwardly to engage lever 400 and rotate same counterclockwise as viewed in FIGURE 25 against the spring 405. Thereafter the cam portions 404 of lever 400 release or unlatch the clapper 374 by urging same to the position illustrated in FIGURE 27. The extent of rotation of lever 400 by the clapper release rod 406 is limited by the stop pin or abutment 407. Upon release of the clapper 374 the punch card 356 is stripped from the retaining pins 412 by the stripping pins 414 after having been moved laterally away from the contacts 381 in the housing 370 and the pins provided on the latched code plate 385. Thereafter the punch card 356 falls through the slot 411 (FIGURE 27) into a suitable container, not shown.

The opening of the clapper 374 and the discharge of the punch card 356 takes very little time. Thereafter the code plate release rod 408 is actuated by cam 410. As a result thereof the rod 408 is moved upwardly as viewed in FIGURE 27 to rotate lever 392 counterclockwise to urge the catch 396 away from the code plate 385 which is moved, as an example, by suitable spring means, not shown, to a loading position shown in FIGURE 28 ready to receive the next punch card.

After the punch card is received in the destination box 364, the closing of the clapper 374 rotates the code plate to the position shown in FIGURE 25 at which time the spring 398 urges the lever 392 into latching position. The rods 406 and 408 return by gravity to their nonoperative positions after passing the cams 409 and 410.

In FIGURE 17, the vehicle computer panel 366 is provided with two vertically arranged rows of photocells designated rows *a* and *b*. Each row *a* and *b* is provided with fifteen photocells. The panel 366 also includes three vertically extending rows of lights designated as rows *c*, *d* and *e*. Each row *c*, *d* and *e* is provided with fifteen lights. In order to describe the operation of the invention it is only necessary to discuss the functioning of the photocells in row *a* and the lights in row *c*. The photocells in row *b* and the lights in rows *d* and *e* are connected to their respective electrical circuits and are provided as a safety feature. The lights and photocells are available for immediate use upon failure of the photocells in row *a* or the lights in row *c*.

The fifteen lights in row *c* of the vehicle computer panel 366 are connected in parallel in circuit 384 of FIGURE 22. Each light is connected in series with a switch located in the destination box 364.

The fifteen photocells in row *a* of the panel 366 are connected in parallel in the vehicle photocell circuit 383 of FIGURE 21. Each light is connected in series with a switch located in the destination box 364. The photocells and switches Nos. 1–5 inclusive are electrically connected to control relay 420 provided with a switch 422. The photocells and switches Nos. 6–10 inclusive are electrically connected to control relay 424 provided with a switch 426. The photocells and switches Nos. 11–15 inclusive are electrically connected to control relay 428 provided with a switch 430. The control relay switches 422, 426 and 430 are connected in series with the windings of the solenoid 432.

The stationary computer panel 336 as shown in FIGURE 19 is provided with two vertically arranged rows of photocells designated rows *f* and *g*. Each row *f* and *g* comprises fifteen photocells. The panels 336 are secured to the vertical flange or web 24 of the track 20 by bolts or the like. The panel 336 also includes three vertically arranged rows of lights designated rows *h*, *i* and *j*. Each row *h*, *i* and *j* is provided with fifteen lights. The photocells in row *g* and the lights in rows *i* and *j* are provided for safety purposes and will function upon failure of the photocells or lights in rows *f* and *h* respectively.

FIGURE 36 illustrates the stationary panel photocell and light circuit 438 provided with fifteen lines arranged in parallel, each line having therein a photocell from row *f*, a light from row *h* and a "GO" switch located in the computer 340.

The stationary computer panel 336 of FIGURE 19 also includes three vertically arranged rows of lights designated *k*, *l* and *m*, each row consisting of fifteen lights. The lights in rows *l* and *m* are provided for safety purposes in the event of light failure in row *k*. The lights in row *k* are connected in the circuit 440 of FIGURE 38. Each light is connected in series to a "GO" switch located in the computer 340.

For purposes of illustration, let us assume once again that a passenger enters the station 2802 and desires to travel to station 2811. The passenger deposits the fare in fare box 352 and indicates on the dial 358 the station 2811. As a result thereof the card 356 is punched in six places as illustrated in FIGURE 23. Three of the holes will permit closing of three-photocell switches while the remaining three holes will permit closing of three light switches upon insertion of card 356 in the destination box 364.

After the card 356 is punched the passenger enters a vehicle waiting at station 2802. Upon insertion of the card 356 into the destination box 364 as illustrated in FIGURE 28 and upon closing of the clapper 374 as illustrated in FIGURE 25, the vehicle door closes. In addition, the switches 2, 8 and 11 in the vehicle photoelectric cell circuit 383 of FIGURE 21 close. Also the light switches corresponding to lights 2, 8 and 11 of the vehicle light circuit 384 of FIGURE 22 close.

The closing of the six switches in the destination box 364 permits the vehicle to come under the control of the computer 340. The electromagnetic drive moves the vehicle up to the stationary computer panel 336 located in station 2802. The vehicle lights 2, 8 and 11 of row *c* send a signal into the corresponding photoelectric cells 2, 8 and 11 of row *f* of the stationary panel 336. If the traffic in the closed system is clear the "GO" switches in the computer circuit 438 of FIGURE 36 close energizing the stationary panel lights 2, 8 and 11. As a result thereof lights 2, 8 and 11 of panel 336 send a signal back to the photoelectric cells 2, 8 and 11 of row *a* of the vehicle computer panel 366. As a result thereof the light switches 2, 8 and 11 of the vehicle light circuit 384 close as shown in FIGURE 22. The magnetically driven vehicle leaves the loading station 2802 heading for station 2811.

Upon closing of the three switches in the vehicle photocell circuit 383 the control relays 420, 424 and 428 are energized to effect closing of the control relay switches 422, 426 and 430. As a result thereof the solenoid 432 is energized to effect the release of the overhead cam follower 60. The overhead cam follower 60 picks up the corresponding overhead cam rail to permit the vehicle to gradually and smoothly enter the main line of the closed loop system.

After the vehicle has entered the main loop system the cam follower 60 is returned to its normally nonoperative position. The electromagnetic drive moves the vehicle through the closed loop system at a substantially constant speed under the control of the computer 340.

The computer 340 as the vehicle nears station 2811 turns on the lights 2, 8 and 11 of row *k* of panel 336 as illustrated in the circuit 440 of FIGURE 38. As the vehicle passes the stationary computer 336 panel located a few hundred feet prior to station 2811 the lights 2, 8, and 11 of circuit 440 send a signal into the photoelectric cells 2, 8 and 11 of circuit 383 of the vehicle computer panel 366. As a result thereof the corresponding photoelectric cell switches close to energize the control relays and control relay switches and finally solenoid 432. Thereafter the overhead cam follower 60 is released and picks up and follows the overhead cam entering station 2811.

Once the overhead cam follower 60 has been raised to the position shown in FIGURE 33 to permit the vehicle, as an example, to leave a loading station and enter the main loop A, it is necessary to reset the cam follower 60 so as to return the follower 60 to a lowered and latched position as illustrated in FIGURE 29. In order to reset the cam follower 60 an overhead cam mechanism 441 of the type illustrated in FIGURES 39–41 inclusive is provided. The overhead cam mechanism 441 is located adjacent and supported by the top wall of the endless conduit A. The mechanism 441 includes an overhead stationary cam 442 having a downwardly inclined camming surface 444 and a movable overhead cam 446 pivotally mounted on a bracket 448 intermediate the ends thereof by a pivot pin 450. The movable cam 446 includes a pair of downwardly inclined camming surfaces 452 and 454 of different inclinations.

A latch 456 including a trip-arm 457 is pivotally connected on the extreme end of the movable cam 446 for cooperable engagement with a stationary catch 458. A spring 460 is interposed between the latch 456 and the movable cam 446 for biasing the latch towards a released position as illustrated in FIGURE 39. When latch 456 is in the released position the cam 446 is in a position which permits vehicles with the cam followers 60 lowered to pass thereunder without any obstruction. A spring loaded dash pot 462 is connected to the top wall of the conduit and to the cam 446 between bracket 448 and the latch 456 as illustrated in FIGURE 40.

Once the vehicle provided with the raised cam follower 60 has entered the loop A, the roller 272 of the cam follower initially engages the downwardly inclined camming surface 444 and as a result thereof the cam follower 60 is partially moved toward the lowered position. FIGURE 39 illustrates in dotted lines the roller 272 in contact with the camming surface 444 which partially resets the follower 60. As the vehicle continues to move to the right as viewed in FIGURE 40, the roller 272 contacts the downwardly inclined camming surface 452 which is effective to rotate the movable cam 446 in a clockwise direction about pivot 450 so as to raise the left end of the cam 446 as viewed in FIGURE 40. As a result thereof the roller 470 of the catch 458 engages the latch portion 472 of latch 456 as illustrated in FIGURE 40 to hold the cam 446 in an adjusted latched position. As the vehicle continues to move to the right as viewed in FIGURE 39, the roller 272 of the raised cam follower 60 is lowered further by camming surface 454 until finally the follower 60 is latched in the lowered position by means of the latch 300 illustrated in FIGURE 29. Thereafter roller 272 contacts the trip-arm 457 of latch 456 as illustrated in FIGURE 40 and rotates latch 456 counterclockwise effective to release the latch 456 from the catch 458. Spring 460 returns the latch to the position illustrated in FIGURE 39 after which time the spring biased dash pot 462 returns cam 446 to the position illustrated in FIGURE 39.

In view of the foregoing the overhead cam follower 60 is reset by the overhead cam mechanism 441. The overhead cam 446 is pivoted at 450 so as to clear a cam follower 60 that is set or in other words is in a lowered position. When the cam follower 60 is up, however, its initial engagement with the movable cam 446 tilts or resets the cam 446 in a more slanted attitude where it can fully activate the raised cam follower 60. The spring loaded latch 456 holds the cam 446 in its reset position momentarily until the cam follower 60 traverses the entire length of the cam 446. At the latter end of the cam 446, the cam follower 60 engages the cam reset latch arm 457 and trips the latch mechanism 456. The latch 456 is consequently flipped forward where it no longer engages the cam 446 as illustrated in FIGURE 39. The cam 446 then tilts up and away from the vehicle so it clears the next overhead cam followers that are set.

The computer 340 controls the velocity of the vehicle, as an example at a constant speed of 45 miles per hour. As the vehicle leaves the main loop the speed of the vehicle under the control of the computer 340 is gradually reduced until finally the vehicle comes to a stop in station 2811. The door of the vehicle opens automatically to permit the passenger to leave the vehicle.

The computer 340 not only steers and controls the velocity of the vehicles but also keeps track and accounts for the position of the vehicles in the closed loop and the various stations. The computer 340 continuously receives various signals from the stationary computer panels 336, 342, 344 and 346 in the closed loop and stations. A series of time switches located in computer 340 will simulate the position of the vehicles in the system.

Prior to a vehicle leaving a station, as an example, station 2802, the time switches of computer 340 will simulate the converging of all vehicles in a station, as an example, station 2811, to which the vehicle at station 2802 is heading. The computer 340 checks all vehicles headed for station 2811 and also compares the time of arrival. If the arrival time of several cars coincides, a traffic jam may occur. Thus the speed of various vehicles headed for station 2811 is automatically reduced slightly by the computer 340 to eliminate any traffic jam. The vehicle at station 2802 will not be given the "GO" signal until the computer is satisfied that the vehicle can proceed to station 2811 without causing a traffic jam. It is thus apparent that computer 340 accounts for time. The computer knows exactly how much time is required to go from one station to another. If any station is overloaded with vehicles, the computer will direct vehicles heading for the overload station to another adjacent station or will reduce the speed of the vehicles until the traffic jam has been eliminated.

Summary

*A method of individual mass transportation*

Present forms of transportation involve movement of "groups" of people, generally 30 or more, wherein all must stop to load or unload even a single passenger. The system of the present invention, path selected by rails, still maintain the public's desire of the privacy of the individual vehicle. This system combines the advantages of automobiles with the nonstop movement of railroad traffic. It is a completely automatic, private, destination selected, electronically chauffeured vehicle.

The successful operation of a full scale experimental vehicle of the present invention on a short track, and completion of all other design engineering yields the following concept: The system is visualized as a structural tube supported above, alongside, or beneath present transportation facilities, or along entirely new routes. Through this tube passes individual cars or vehicles containing two seats facing one another. Windows in the vehicle and tube will afford unusual views of the city from treetop level.

Operation of the system by the passenger consists of entering a station (a side tube) either at the upper main level or below at the surface level. Underground stations would be determined by site limitations. Entering the first car in the line the passenger selects his destination, the door closes, and the car proceeds automatically to the selected point (internal or external fare systems as required). The speed of the vehicle is predetermined by the selected design of the system, but each line will have all vehicles moving at substantially the same speed. The recommended speed is 45 m.p.h., but express lines at 90 m.p.h. or more and feeder lines at 20 m.p.h. or less are left to the requirements of each system.

During any trip a dropdown safety table in the vehicle permits working if the passenger wishes, or he may sit back in a soft cushion seat. The temperature of the tube and vehicle is controlled and the air is free from all contaminants and odors. The vehicles as well as the conduit are air conditioned.

The vehicle is made of light weight laminated type aircraft construction and has a total weight of less than 300 pounds. Two tube diameters have been selected which were determined by the dimensions of the vehicle. An aluminum 6 x 7 foot rounded rectangular tube; and a 10 x 7 foot two way tube. Both are structurally the support for the electromagnetic drive and the vehicles. The rail system within the tube is an integral portion of the tube.

"C" type rails are used which lock the cars to the rail making derailment impossible. Wheels are rubber and steel, with double coaxial bearings, and the tube is lined with acoustical material providing excellent noise suppression.

Supports for the tube are slender because of the low weight. They may be single pillars of steel or concrete on eighty foot centers with any desired height. They may be "A" frame, inverted "U" supports, or arches spanning roads or expressways. Street lighting could be added to the tube such as fluorescents giving continuous ribbons of light. Power and communication lines could also be added which would eliminate poles from the streets.

The system uniquely introduces the following advantages: (1) all weather operation; (2) clean and hygenic; (3) a "no waiting" form of transportation; (4) completely insulated and concealed electric power; (5) no moving parts; (6) extremely low noise level; (7) extremely low weight of car; (8) extremely low weight of tube; (9) low cost per mile; (10) crewless operation; (11) privacy.

SPECIFICATION

Suggested volume per line: 9,000 cars per hour.
Maximum volume per line: 17,000 cars per hour.
Maximum passengers per line: If two persons per car, up to 34,000 per hour.
Speed of cars (suggested): City, 45 m.p.h. continuous; suburb, 60 m.p.h.; between cities, 120 m.p.h.
Acceleration: Up to 2 $g$'s, .3 $g$'s suggested.
Grade: Up to 100%.
Turning radius: 40 feet minimum at 30 m.p.h., 50 feet minimum at 45 m.p.m.
Span distance: 80 feet, more or less if desired.
Destination selection: Electronically controlled.
Operation: Computer controlled, TV monitored at stations.
Power: Standard industrial, no third rail, only used where car is in motion.
Switching: Instantaneous, permanent switches, no moving rails.
Rails: Double "C" type, positioned inside tube.
Lowest car weight per passenger of any system.
Vehicle: Air-conditioned, deep cushion armchair seats, lightweight aluminum body, rubber covered wheels, rubber mounted shock absorbers, total weight, 300 pounds.
Conduit: Aluminum or steel construction, completely enclosed, air-conditioned, double windows. Height, any desired.
Placement: Over roads, beside roads, over buildings, through buildings, cross country, over expressways, even underground.
Supports (slender): Arches over expressways, arches over roads, single pillars, "A" frames, inverted "U's," steel, aluminum, or concrete.
Stations (40 x 50 feet minimum): side streets, main streets, inside major buildings, on building roofs, high level, street level, underground, in parking garages, at shopping centers.
Drive: Electromagnetic, no moving parts, no motor, no geartrain, no linkages, no hydraulics, no drive wheels.
Least structural weight of any system.

FEATURES OF THE PRESENT INVENTION

All weather dependability, passenger privacy, passenger comfort.
Highest average speed of any system, completely automatic, always ready to go, never runs empty, profitable.
Continuous service, never have to stand, never have to wait, individual cars, individual destination selection, quiet inside and outside.
More stations possible than any other system, more area serviced than any other system, least structural weight of any system.
Smallest space requirements of any system to date, will move more people, in less space, than any other system, will improve any existing facility, tailored to the needs of the community.
No loss of tax base to city, no relocation of population.
No waiting for the car, no waiting for another passenger, no operator required, no stop and go at every station, no sway, no buffeting, no fumes, no air pollution, no shoving, no bumping.
Right of way uses existing facilities, maximum use of right of way, lowest cost.
No stabilizing equipment, no concrete beams or side wheel: Fastest erection time, completely flexible, location can be changed.

ENGINEERING AND DESIGN SAFETY FEATURES

Inherent to every new concept is the danger of the untried and the unproven. Each new form of transportation has had accidents in the development and use of the system. Some of these have been a direct result of faulty materials and poor engineering. Because the majority of accidents are a direct result of human error, the present invention reduces to the minimum the dependency on human operation.

To afford the maximum engineering safety requires using materials which will not fail at several times the designed maximum load. But to afford the maximum safety for public usage of an entire system requires a more reliable approach than strong materials alone. The design limitations and considerations of the present invention are considered in the following order: (A) tube, (B) rail and cams, (C) supports, (D) computer control and electric drive, (E) vehicles, (F) stations.

(A) *Tube*

(1) The weather problem governing other forms of transportation is eliminated by the basic design of the system. Rain, sleet, snow, ice, and fog do not interfere with its operation.

(2) Cross-wind; tube is designed for a minimum of a 150 m.p.h. wind.

(3) Fire control is affected by means of linear sprinkler system of conventional design as well as extinguishers in each car.

(4) Heating and cooling of tube, dependent on seasonal temperatures, is controlled by air conditioning units at each station.

(5) Air purity of tube is uniformly maintained, eliminating or decreasing pollen, dust, smog, etc.

(6) Internal air resistance of a single line tube is used to aid air conditioning and cool the heat generating portions of the system.

(7) No air buffeting possible in the double track tube because of separation by the inspection walkway.

(8) Structural strength; design factor of twenty times the expected maximum load for both single and double tubes.

(9) Thermal expansion; design minimum from 30 degrees below zero to 150 degrees above zero.

(10) Tube failure; due to collision by surface vehicle or falling objects landing on tube, a sensor in each tube segment responds and shuts down that portion of the line between the two stations. The rest of the line inbound to the break shunts all cars into the nearest station, or turns off the entire inbound line depending upon the number of cars in the line until damage is ascertained. Rerouting is possible.

(11) Shear factor of the tube is higher than the strength of the support. If a support is knocked out from a collision by a surface vehicle, the tube will sag a maximum of one foot. Operation of the line would continue well within safety limits. Temporary or permanent replacement support is quickly and easily installed.

(12) Lightning cannot hurt passengers in the tube, cars or at the stations. The entire line is a conductor, is grounded, and will not conduct an internal current to damage anything within the tubes. The heat generated at the strike point might burn a hole in the tube. Regular visual inspection of tube for all safety factors could note this for later repair.

(13) Galvanic action: none. Either charge controlled or no bimetallic contacts.

(14) Life of tube; expected to be far in excess of 20 years because of the extremely low fatigue factor.

(B) *Rails and cams*

(1) Switching of cars is accomplished by means of permanently positioned rails. At switching areas an overhead guide rail is engaged by a cam follower extended above the car. The cam follower is computer controlled and actuated by the selector control in each car.

(2) Control circuit at each station, and main computer, directs cars to next station or to crossover lines for return to selected station in the event of an emergency.

(3) Rail alignment; large horizontal tolerance of wheel and axle design eliminates any adjustment after construction. The rails are an integral part of the tube, no shifting possible.

(4) Micrometer adjustment allows perfect alignment of rail at time of construction.

(5) Sway: eliminated by aerodynamic design.

(6) Rail is "C" type making it impossible for a car to derail.

(C) *Supports*

(1) Span distance may be any desired length. Eighty feet was chosen for ease of construction.

(2) Types; pillar, "A" frame, arch bridge, arch-truss bridge, suspension and hangers.

(3) Depth of base dependent upon soil conditions and height of tube from the ground.

(4) A unique support design allows the tube and support to disengage in case of severe damage to support.

(5) Material: Metal or concrete.

(D) *Computer control and electromagnetic drive*

(1) Entire line is computer controlled to eliminate human error.

(2) Failsafe on computer shuts down line.

(3) Power failure: All cars immediately brake to a stop. Gravity shoes engage track whenever power is shut off. Passengers may walk to next station on the inspection walkway or they may wait until power resumes. Several alternative solutions for this situation are available and are left to the requirements of the purchasers.

(4) Drive failure; should any individual car slow down or stop in the tube the computer would again shut down the line.

(5) Collisions are prevented by computer controls at main station and each local station. If the impossible does occur and a collision results at a merge line, the computer would shut down the line and indicate the location of the trouble.

(6) Acceleration and deceleration; dependent upon the length of station track and desired tube speed of transit. Low $g$ acceleration of .3 or less recommended. Drive is capable of 2 $g$'s positive or negative.

(7) Line or tube speed is invariable by voltage or amperage fluctuation beyond operating minimum. All cars maintain same speed, plus or minus 2%, which generates a tailgating effect. This creates more available space between groups of cars for merging. At 45 m.p.h. the difference in speed is a maximum of 1.8 m.p.h.

(8) Photocell panels are used for car destination selection.

(9) Emergency button—to override destination selector, raises cam follower and the car exits at the next station. Computer indicates emergency to staff official who will take necessary action.

(E) *Vehicles*

(1) Temperature; air conditioning of tube supplies air to car on ram principle providing continuous change of clean air at controlled temperature.

(2) Safety bar for passengers drops down when door is closed providing table in front of both passengers. It may then be removed by choice of the passenger by lifting it back up against the wall of the car. Automatic door opener at station lifts table as the door is opened.

(3) Seats are designed to provide maximum comfort and safety. A headrest provides protection against whiplash effect. Table safety bar stops person from sliding to opposite end of car in emergencies.

(4) Curves; all are designed with inclined track-beds such that the center of gravity for a given velocity remains on the centerline of the car.

(5) Vehicle is lightweight, laminated aluminum, of aircraft type construction with molded chairs, sponge and vinyl covered.

(6) Incremented shock absorbers on both ends of car. 100 pounds in the first inch to 10,000 pounds in the last inch over a 10 inch travel.

(7) Undercarriage is an eight wheel double truck with rubber mounted shock absorbers to carry a 3 length armature.

(8) Wheels designed for speeds up to 120 m.p.h.

(9) Emergency brakes are gravity type and operated immediately or ⅓ second after power failure.

(10) Car will not operate unless door is closed. Door locks when car moves.

(11) Internal power for lighting, etc., from 12 volt contact along third rail.

(12) Fire in car; increase in temperature inside car to 110 degrees shunts car out at nearest station and operates an internal water mist (fog) extinguisher.

(F) *Station*

(1) Stations may be located either at street level beside the tube, inside buildings, at upper levels, at tube level, or side streets, wherever conditons indicate. Emergence of passengers is to a guarded walkway protecting them from other rail lines and moving cars.

(2) At all stations the tube entrance is blocked automatically, except when cars are passing. In addition, a detector is so located that any person entering the tube on foot would shut down the station and notify the police of point of trouble.

(3) Stations may have TV monitors on closed circuit. Vandals and any criminal action are video taped or photographed at control center and used for identification purposes. Emergencies are quickly identified.

(4) Automatic door opener on car operates as car comes to stop at station.

(5) Each station has merging sensor or secondary computer which overrides main computer in the event of an eminent collision. Control will either accelerate car or slow it to correct the merging action.

The drawings and the foregoing specification constitute a description of the improved Automatically Controlled Passenger Vehicle System in such full, clear, concise and exact terms as to enable any persons skilled in the art to practice the invention, the scope of which is indicated by the appended claims.

I claim:

1. In an automatically controlled vehicle system comprising, a plurality of tracks, vehicle means on said tracks for movement thereon, power driven means interposed between said tracks and said vehicle means mechanically unconnected therebetween for moving said vehicle means along said tracks, switching means on said vehicle means located in juxtaposition to said tracks, and an electronically controlled computer operatively connected to said vehicle means for controlling said power driven means and said switching means.

2. The improvement according to claim 1 wherein said vehicle means includes, a body having wheels at the front and rear thereof, an opening in said body along one side and part of the top, a door for said opening hingedly connected on the upper end to the top of said body, and means for opening and closing said door.

3. An automatically controlled vehicle system comprising a loading station and an unloading station, track means extending between said stations and including a main track and a spur track, a vehicle on said track means for movement between said stations, power driven means interposed between said track means and said vehicle for propelling said vehicle along said track means, actuating means extending adjacent to said track means to effect switching between said main track and said spur track, and automatic control means operatively connected to said power driven means to control the operation of said vehicle and said actuating means.

4. The improvement according to claim 3 wherein said power driven means includes an electromagnetic linear motor having an armature portion mounted on said vehicle in juxtaposition to exteriorly mounted stators for movement of said vehicle along said tracks.

5. The improvement according to claim 3 wherein said automatic control means includes an electronic computer having selected coded means for programming said computer to control the operation of said vehicle.

6. The improvement according to claim 5 wherein at least a portion of said selected coded means is carried by said vehicle.

7. The improvement according to claim 5 wherein said selected coded means is responsive to optical sensory means.

8. The improvement according to claim 5 wherein said selected coded means is responsive to electrical means.

9. The improvement according to claim 5 wherein said selected coded means is responsive to magnetic means.

10. In a transportation system comprising a plurality of tracks including a main track and a spur track, vehicle means on said tracks for movement thereon, power means interposed between said vehicle means and said tracks to move said vehicle means on said tracks, and switching means including means extending downwardly from said vehicle means to effect switching of said vehicle means between said main track and said spur track.

11. The improvement according to claim 10 wherein said vehicle means includes a plurality of free-wheeling weight bearing wheels and at least one guided wheel for engagement with a guiding track.

12. The improvement according to claim 11 wherein said guided wheel is cooperatively associated with actuating means operated by said switching means to transfer said vehicle means between a main track and a spur track.

13. The improvement according to claim 10 wherein said plurality of tracks is fixed and immovable at all times with respect to said vehicle means.

14. The improvement according to claim 10 wherein said power means includes a pneumatic system having a plurality of pumps and said vehicle means is encased in a continuous sealed tube whereby said vehicle is propelled through said tube.

15. The improvement according to claim 10 wherein said power means includes a linear motor.

16. The improvement according to claim 15 wherein said linear motor includes stator means mounted adjacent said tracks and a thruster means on said vehicle means to provide a linear thrust to said vehicle means upon the application of electrical power.

References Cited

UNITED STATES PATENTS

| | | | |
|---|---|---|---|
| 217,925 | 7/1879 | Burton | 104—138 X |
| 229,526 | 7/1880 | Dutrow | 104—119 |
| 372,749 | 11/1887 | Hagerty | 104—138 |
| 418,718 | 1/1890 | Henning | 104—138 |
| 449,126 | 3/1891 | Little | 104—18 |
| 986,981 | 3/1911 | Hern et al. | 105—393 X |
| 1,532,171 | 4/1925 | Burmeister | 49—360 X |
| 1,607,260 | 11/1926 | Kruckenberg | 104—138 |
| 1,813,625 | 7/1931 | Knox | 104—155 |
| 1,915,149 | 6/1933 | Blackhall et al. | 105—329 X |
| 2,044,134 | 6/1936 | Storer | 105—25 |
| 2,101,711 | 12/1937 | Hubbell | 295—85 X |
| 2,130,131 | 9/1938 | Hirshfeld | 105—329 X |
| 2,211,589 | 8/1940 | Widnier | 61—42 |
| 2,296,771 | 9/1942 | Crawford et al. | 104—138 |
| 2,522,626 | 9/1950 | Lyles | 105—217 |
| 2,929,337 | 3/1960 | Romans | 105—393 X |
| 3,072,785 | 1/1963 | Hailes | 246—177 |
| 3,158,765 | 11/1964 | Polgreen | 310—12 |
| 3,240,929 | 3/1966 | Hughson | 105—61 X |
| 3,247,892 | 4/1966 | Harmon | 160—207 |

FOREIGN PATENTS

| | | |
|---|---|---|
| 1,277,755 | 10/1961 | France. |
| 913,736 | 12/1962 | Great Britain. |

OTHER REFERENCES

Howson, F. H.: World's Underground Railways, published 1964, pp. 87, 88 and 89.

ARTHUR L. LA POINT, *Primary Examiner.*

H. BELTRAN, *Assistant Examiner.*